(12) United States Patent
Ito et al.

(10) Patent No.: US 10,225,454 B2
(45) Date of Patent: Mar. 5, 2019

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Ryogo Ito, Tokyo (JP); Shiro Eshita, Tokyo (JP); Kazuma Akamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 15/310,151

(22) PCT Filed: Mar. 19, 2015

(86) PCT No.: PCT/JP2015/058348
§ 371 (c)(1),
(2) Date: Nov. 10, 2016

(87) PCT Pub. No.: WO2015/178088
PCT Pub. Date: Nov. 26, 2015

(65) Prior Publication Data
US 2017/0142320 A1    May 18, 2017

(30) Foreign Application Priority Data

May 19, 2014 (JP) ................................. 2014-103611

(51) Int. Cl.
*G06F 13/00* (2006.01)
*H04N 5/225* (2006.01)
(Continued)

(52) U.S. Cl.
CPC ......... *H04N 5/23206* (2013.01); *G06F 13/00* (2013.01); *H04N 5/225* (2013.01);
(Continued)

(58) Field of Classification Search
CPC ........... H04N 5/23206; H04N 5/23225; H04N 5/23245; H04N 5/23296
See application file for complete search history.

(56) References Cited

U.S. PATENT DOCUMENTS 6,670,933 B1 * 12/2003 Yamazaki ............. G06F 3/1454
340/4.62
2006/0294209 A1 * 12/2006 Rosenbloom ..... G06F 17/30035
709/220

(Continued)

FOREIGN PATENT DOCUMENTS

JP   08-237635      9/1996
JP   08-237635 A    9/1996
(Continued)

*Primary Examiner* — Amy R Hsu
(74) *Attorney, Agent, or Firm* — Chip Law Group

(57) ABSTRACT

[Object] To provide an information processing apparatus, information processing method, program, and information processing system that are capable of preventing image capturing instructions transmitted from a plurality of information processing terminals from contending with each other in a communication mode where the plurality of information processing terminals are connected to an image capturing apparatus.

[Solution] An information processing apparatus includes: a receiver configured to receive an instruction to capture an image from at least one of a plurality of external devices via a wireless communication channel, each of the external devices having priority set previously; and a controller configured to control an operation of an imaging unit based on the instruction depending on the priority set in the external device serving as a source for transmission of the instruction, the imaging unit being configured to capture the image.

20 Claims, 21 Drawing Sheets

(51) Int. Cl.
*H04N 5/232* (2006.01)
*H04N 21/6377* (2011.01)

(52) U.S. Cl.
CPC ......... *H04N 5/232* (2013.01); *H04N 5/23225* (2013.01); *H04N 5/23245* (2013.01); *H04N 5/23296* (2013.01); *H04N 21/6377* (2013.01)

(56) References Cited

U.S. PATENT DOCUMENTS

| | | | | |
|---|---|---|---|---|
| 2010/0229194 A1* | 9/2010 | Blanchard | ............... | G06F 3/038 |
| | | | | 725/39 |
| 2011/0202957 A1* | 8/2011 | Cho | ....................... | G08C 17/02 |
| | | | | 725/38 |
| 2011/0247036 A1* | 10/2011 | Adimatyam | ....... | H04N 5/44543 |
| | | | | 725/40 |
| 2014/0267642 A1* | 9/2014 | Wexler | ................. | G09B 21/006 |
| | | | | 348/62 |
| 2015/0116449 A1* | 4/2015 | Oetting | .................. | H04N 7/157 |
| | | | | 348/14.07 |
| 2015/0124109 A1* | 5/2015 | Kryeziu | ............. | H04N 5/23206 |
| | | | | 348/211.3 |

FOREIGN PATENT DOCUMENTS

| | | | |
|---|---|---|---|
| JP | 2001-326845 | A | 11/2001 |
| JP | 2006-270263 | A | 10/2006 |
| JP | 2008-098914 | A | 4/2008 |
| JP | 2011-004211 | A | 1/2011 |
| JP | 2011-223405 | A | 11/2011 |
| JP | 2013-013064 | A | 1/2013 |

\* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2015/058348 filed on Mar. 19, 2015, which claims priority benefit of Japanese Patent Application No. JP 2014-103611 filed in the Japan Patent Office on May 19, 2014. Each of the above-referenced applications is hereby incorporated herein by reference in its entirety.

TECHNICAL FIELD

The present disclosure relates an information processing apparatus, an information processing method, a program, and an information processing system.

BACKGROUND ART

Some devices including digital still cameras or digital video cameras (sometimes referred to collectively as "digital camera" hereinafter) that can be connected to an information processing terminal such as a smartphone via a wireless network. Thus, examples of communication standards allowing different types of devices to be connected to each other via a wireless network include wireless fidelity (Wi-Fi, registered trademark).

In recent years, there has been provided a function allowing an image capturing apparatus such as a digital camera to be operated through an information processing terminal by connecting the information processing terminal and the image capturing apparatus to each other via a network. With the provision of such a function, some of the image capturing apparatus have a limited (e.g., simplified or eliminated) input-output interface.

CITATION LIST

Patent Literature

Patent Literature 1: JP 2013-013064A
Patent Literature 2: JP 2001-326845A
Patent Literature 3: JP 2011-004211A

SUMMARY OF INVENTION

Technical Problem

The communication mode allowing different types of devices to be connected to each other via a wireless network is not limited to a communication mode in which one device is connected to another one-to-one. As one example, a communication mode (i.e., one-to-n communication mode) in which one device (parent device) is connected to a plurality of other devices (child devices) can be provided. The use of such a communication mode allows one image capturing apparatus to be connected to an information processing terminal held by each of a plurality of users, and thus a technique that allows an image captured by the image capturing apparatus to be shared among the plurality of users is demanded.

On the other hand, in the communication mode in which a plurality of information processing terminals are connected to an image capturing apparatus, an instruction to capture an image that is transmitted from each information processing terminal to the image capturing apparatus contends with each other. Thus, in some cases, the image capturing apparatus may fail to perform an operation intended by each user.

Therefore, the present disclosure provides a novel and improved information processing apparatus, information processing method, program, and information processing system, capable of preventing image capturing instructions transmitted from a plurality of information processing terminals from contending with each other in a communication mode where the plurality of information processing terminals are connected to an image capturing apparatus.

Solution to Problem

According to the present disclosure, there is provided an information processing apparatus including: a receiver configured to receive an instruction to capture an image from at least one of a plurality of external devices via a wireless communication channel, each of the external devices having priority set previously; and a controller configured to control an operation of an imaging unit based on the instruction depending on the priority set in the external device serving as a source for transmission of the instruction, the imaging unit being configured to capture the image.

According to the present disclosure, there is provided an information processing apparatus including: a controller configured to associate an instruction to capture an image with priority previously set in the information processing apparatus with respect to another apparatus; and a transmitter configured to transmit the instruction associated with the priority to an external device via a wireless communication channel, the external device controlling an operation for capturing the image.

According to the present disclosure, there is provided an information processing method including: receiving an instruction to capture an image from at least one of a plurality of external devices via a wireless communication channel, each of the external devices having priority set previously; and controlling, by a processor, an operation of an imaging unit based on the instruction depending on the priority of the external device serving as a source for transmission of the instruction, the imaging unit being configured to capture the image.

According to the present disclosure, there is provided an information processing method including: associating, by a processor, an instruction to capture an image with priority previously set with respect to another apparatus; and transmitting the instruction associated with the priority to an external device via a wireless communication channel, the external device being configured to capture the image.

According to the present disclosure, there is provided a program for causing a computer to execute: receiving an instruction to capture an image from at least one of a plurality of external devices via a wireless communication channel, each of the external devices having priority set previously; and controlling an operation of an imaging unit based on the instruction depending on the priority of the external device serving as a source for transmission of the instruction, the imaging unit being configured to capture the image.

According to the present disclosure, there is provided a program for causing a computer to execute: associating an instruction to capture an image with priority previously set with respect to another apparatus; and transmitting the instruction associated with the priority to an external device via a wireless communication channel, the external device being configured to capture the image.

According to the present disclosure, there is provided an information processing system including: a control apparatus configured to control an operation of an imaging unit configured to capture an image; and a plurality of information processing terminals, each of the information processing terminals having priority set previously. The information processing terminal includes a transmitter configured to transmit an instruction to capture an image to the control apparatus via a wireless communication channel. The control apparatus includes a receiver configured to receive the instruction from at least one of the plurality of information processing terminals via the communication channel, and a controller configured to control an operation of the imaging unit based on the instruction depending on the priority set in the information processing terminal serving as a source for transmission of the instruction.

Advantageous Effects of Invention

According to the present disclosure described above, there is provided a novel and improved information processing apparatus, information processing method, program, and information processing system, capable of preventing image capturing instructions transmitted from a plurality of information processing terminals from contending with each other in a communication mode where the plurality of information processing terminals are connected to an image capturing apparatus.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
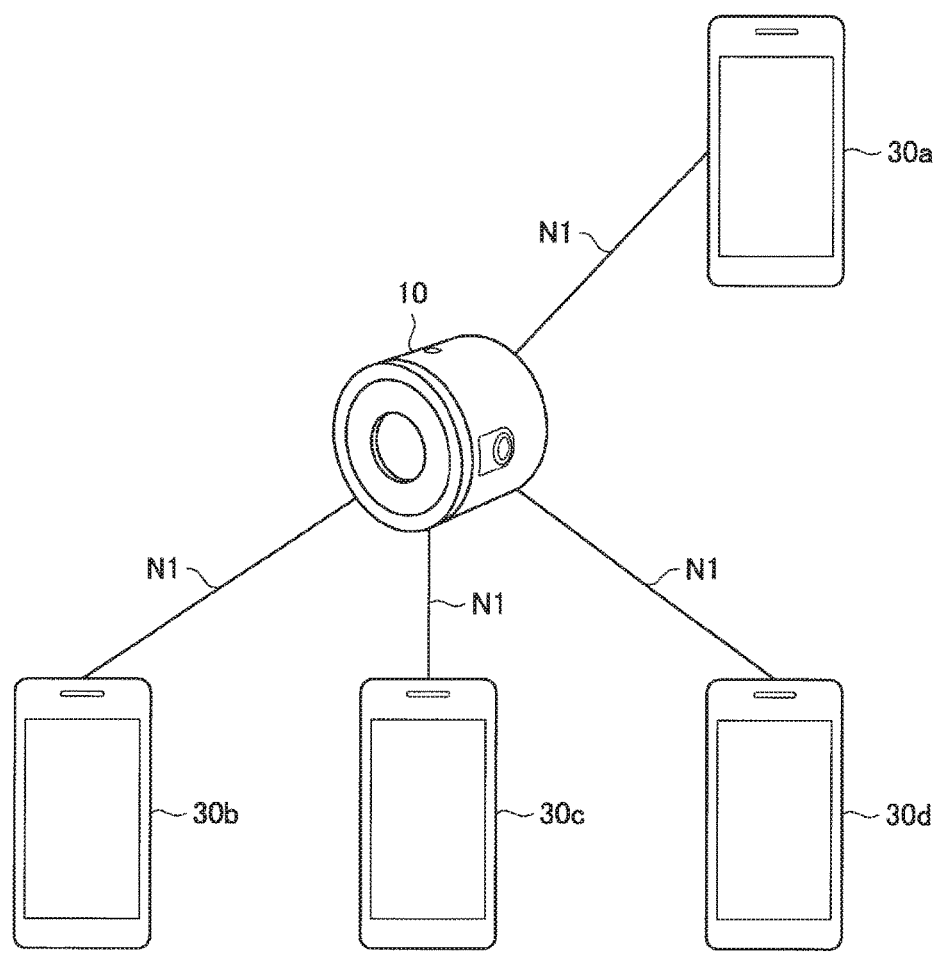
FIG. 1 is a schematic diagram illustrated to describe an exemplary system configuration of an information processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. First Embodiment
 1.1. Overview
 1.2. Method of identifying state where image capturing apparatus and information processing terminal are in close contact with each other
 1.3. Functional configuration
  1.3.1. Case of recognizing information processing terminal as entity to be master
  1.3.2. Case of recognizing image capturing apparatus 10 as entity to be master
 1.4. Processing
  1.4.1. Processing of recognizing information processing terminal as entity to be master 1.4.2. Processing of recognizing image capturing apparatus as entity to be master
1.4.3. Processing for image capturing
1.5. Modifications
    1.5.1. Modification 1: Example of method of identifying master
    1.5.2. Modification 2: Operation of case where a plurality of image capturing apparatus are provided
2. Second Embodiment
3. Third Embodiment
4. Fourth Embodiment
5. Fifth Embodiment
6. Hardware configuration
7. Conclusion

1. FIRST EMBODIMENT

1.1. Overview

An example of a general system configuration of an information processing system according to a first embodiment of the present disclosure will be described with reference to FIG. 1. FIG. 1 is a schematic diagram illustrated to describe an exemplary system configuration of the information processing system according to the present embodiment.

As illustrated in FIG. 1, the information processing system according to the present embodiment is configured to include an image capturing apparatus 10 and a plurality of information processing terminals 30a to 30d. The image capturing apparatus 10 corresponds to a device for capturing an image including a still image and a moving image, such as a so-called digital camera. The information processing terminals 30a to 30d correspond to a user terminal, such as a so-called smartphone. The information processing terminals 30a to 30d may be referred simply to as "information processing terminal 30" hereinafter unless it is necessary to make a distinction.

The image capturing apparatus 10 is connected to each of the information processing terminals 30a to 30d via a wireless network N1 so that they can communicate with each other. A specific example of the network N1 includes a Wi-Fi (registered trademark)-based network. As one example, when the Wi-Fi (registered trademark)-based network N1 is applied, the image capturing apparatus 10 is operated as an access point, and each of the information processing terminals 30a to 30d is operated as a station and is connected to the image capturing apparatus 10, thereby implementing the communication mode as illustrated in FIG. 1.

In particular, the information processing terminal 30 according to the present embodiment is configured to be capable of controlling an operation of the image capturing apparatus 10 (e.g., an operation for capturing an image) that is connected to the information processing terminal 30 via the network N1. In other words, the image capturing apparatus 10 is capable of capturing an image such as a moving image and a still image based on an instruction transmitted from the information processing terminal 30 via the network N1. This function may be implemented by installing an application, which is created by using, as one example, an application programming interface (API) used to control the operation of the image capturing apparatus 10 via a network, in the information processing terminal 30. An application used to implement the function described above may be certainly incorporated into the information processing terminal 30 previously.

Although the following description will be given by taking a case where the information processing terminal 30 is a smartphone as an example, the information processing terminal 30 is not necessarily limited to a smartphone. As a specific example, a device that is connectable to the image capturing apparatus 10 via a wireless network, such as a remote controller, may be applied to serve as the information processing terminal 30.

Figure 2:
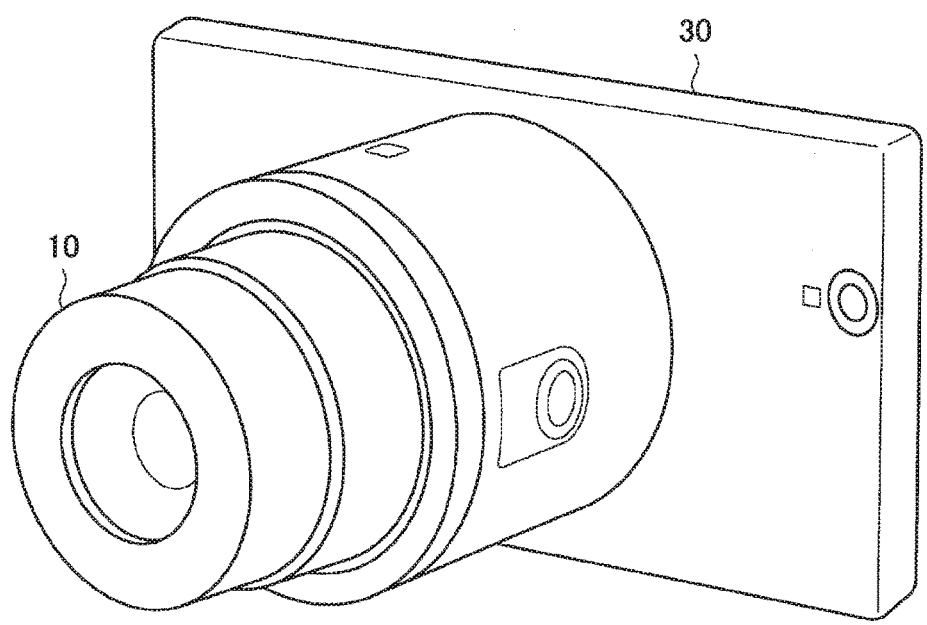
FIG. 2 is a diagram illustrated to describe an exemplary image capturing apparatus having a limited input-output interface.

Such a configuration makes it also possible to use a device having a limited (e.g., simplified or eliminated) input-output interface as the image capturing apparatus 10. As one example, FIG. 2 illustrates an example of the image capturing apparatus 10 having a limited (e.g., simplified or eliminated) input-output interface. In the example illustrated in FIG. 2, in the image capturing apparatus 10, an output interface such as a liquid crystal display is eliminated and an operation interface is limited as well, on the assumption that the information processing terminal 30 is used as an interface used to perform an operation for capturing an image.

The image capturing apparatus 10 may be removably attached to the information processing terminal 30 as illustrated in FIG. 2. As a specific example, the image capturing apparatus 10 may be configured to be attached to the information processing terminal 30 by providing an attachment, which is used to fix the image capturing apparatus 10 to the information processing terminal 30, to the information processing terminal 30 or the image capturing apparatus 10.

The image capturing apparatus 10 illustrated in FIG. 2 is merely an example, and is not necessarily intended to limit the configuration of the image capturing apparatus 10 according to the present embodiment. In other words, a typical image capturing apparatus that is provided with an input-output interface such as a liquid crystal display can be certainly used as the image capturing apparatus 10 as long as it is capable of communicating with the information processing terminal 30 via the network N1.

As illustrated in FIG. 1, the connection of the image capturing apparatus 10 to each of the information processing terminals 30a to 30d via the network N1 makes it possible to allow an image captured by the image capturing apparatus 10 to be shared between the information processing terminals 30a to 30d. As one example, FIG. 3 is a diagram illustrated to describe an exemplary operation mode of the information processing system according to the present embodiment, and illustrates an overview of an operation in the case where the image captured by the image capturing apparatus 10 is shared between the information processing terminals 30a to 30d.

Figure 3:
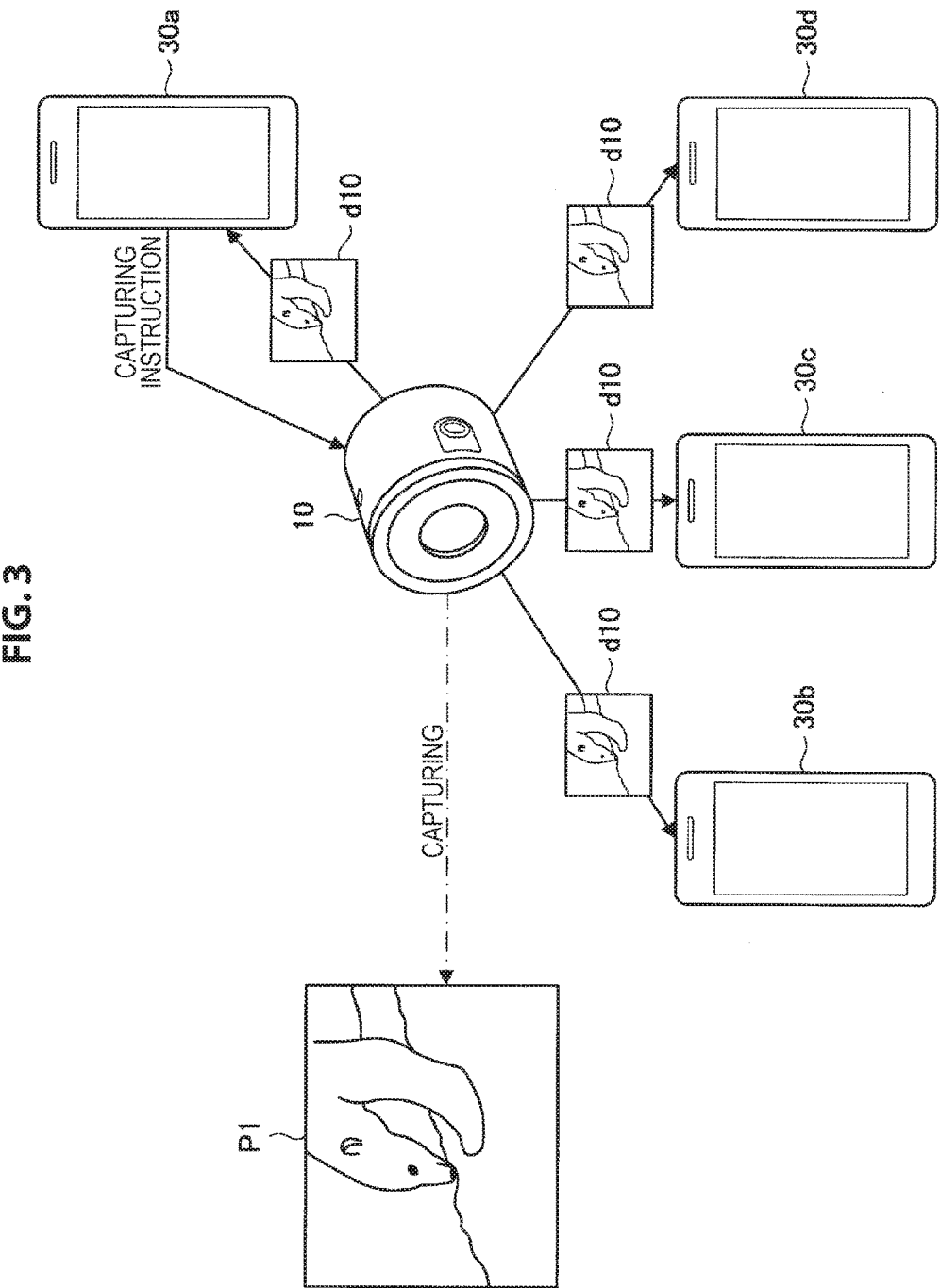
FIG. 3 is a diagram illustrated to describe an exemplary operation mode of the information processing system according to the present embodiment.

In the example illustrated in FIG. 3, the image capturing apparatus 10 captures an image of a photographic subject P1, and transmits a captured image d10 obtained by capturing the image of the photographic subject to each of the information processing terminals 30a to 30d based on an instruction from the information processing terminal 30a. This configuration makes it possible to allow the image d1 of the photographic subject P1 captured based on the instruction from the information processing terminal 30a to be shared between the information processing terminals 30a to 30d.

Figure 4:
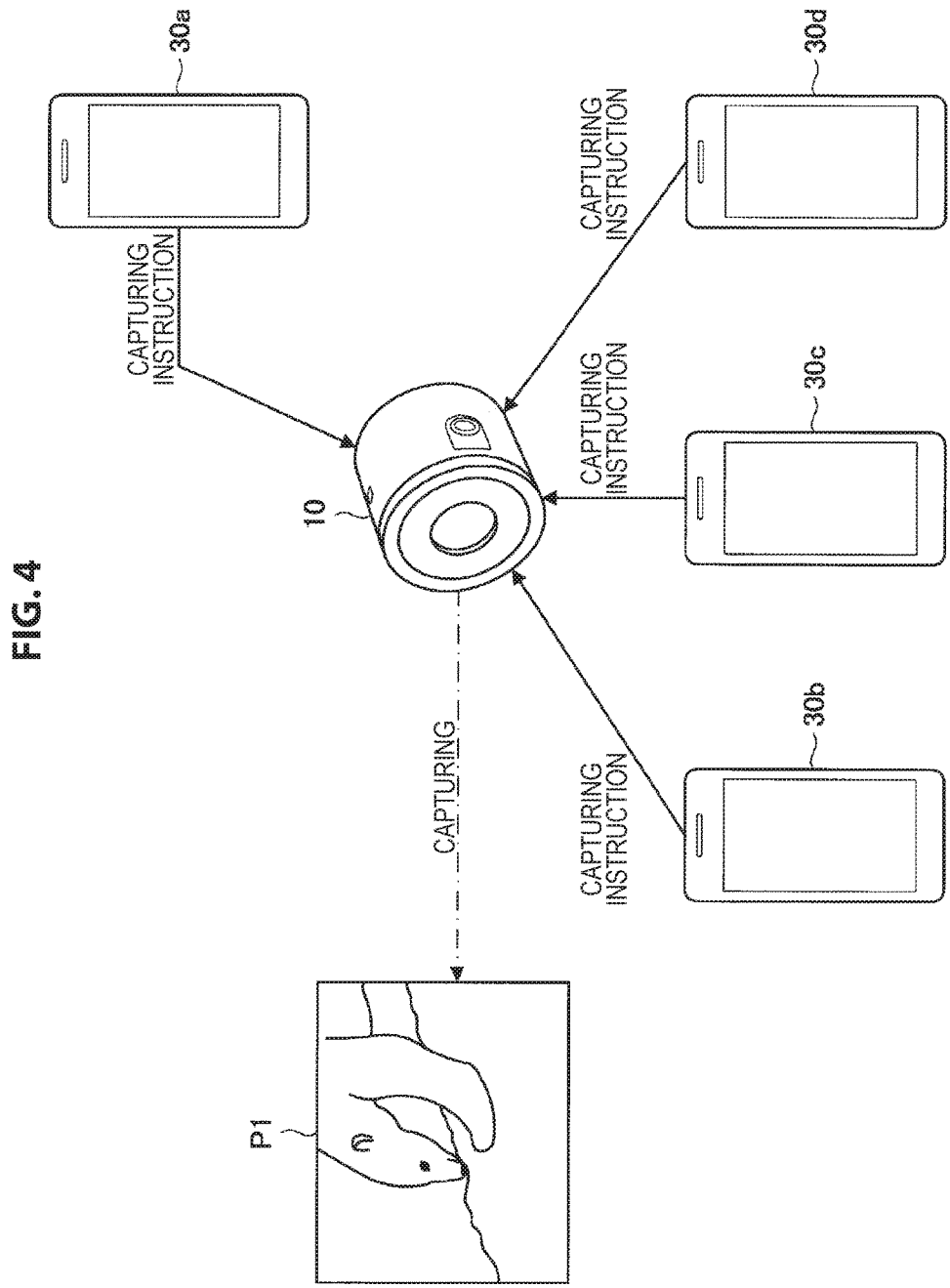
FIG. 4 illustrates an example of the case where an imaging instruction to capture an image is transmitted from a plurality of information processing apparatus to the image capturing apparatus.

On the other hand, as illustrated in FIG. 1, when a plurality of the information processing terminals 30a to 30d are connected to the image capturing apparatus 10, in some cases, a plurality of the information processing terminals 30a to 30d transmit their own image capturing instructions to the image capturing apparatus 10. As one example, FIG. 4 illustrates an example of the case where a plurality of information processing terminals 30a to 30d transmit an imaging instruction to capture an image to the image capturing apparatus 10. An example of the image capturing instruction is not limited to an image capturing instruction, but includes an image capturing instruction such as an instruction to change the magnification ratio for zooming and an instruction to change the shooting condition including a change of the aperture and shutter speed.

As illustrated in FIG. 4, when an imaging instruction to capture an image is transmitted from each of a plurality of the information processing terminals 30a to 30d to the image capturing apparatus 10, these imaging instructions may contend with each other, so the image capturing apparatus 10 fails to perform an operation intended by the user of each of the information processing terminals 30.

As a specific example, it is assumed that the information processing terminal 30a instructs to start capturing a moving image and then the information processing terminal 30b instructs to stop capturing the moving image. In other words, the image capturing apparatus 10 starts capturing an image based on the instruction from the information processing terminal 30a, and then stops the image capturing that is in execution if an instruction from the information processing terminal 30b is receive. In such a case, the stopping of the image capturing based on the instruction from the information processing terminal 30b is not necessarily the operation intended by the user of the information processing terminal 30a.

Thus, the information processing system according to the present embodiment provides a mechanism that allows the image capturing instructions from a plurality of the information processing terminals 30 to be prevented from contending with each other. As one example, FIG. 5 is a diagram illustrated to describe an overview of the information processing system according to the present embodiment, and illustrates an overview of the mechanism that allows the image capturing instructions from a plurality of the information processing terminals 30 to be prevented from contending with each other.

Figure 5:
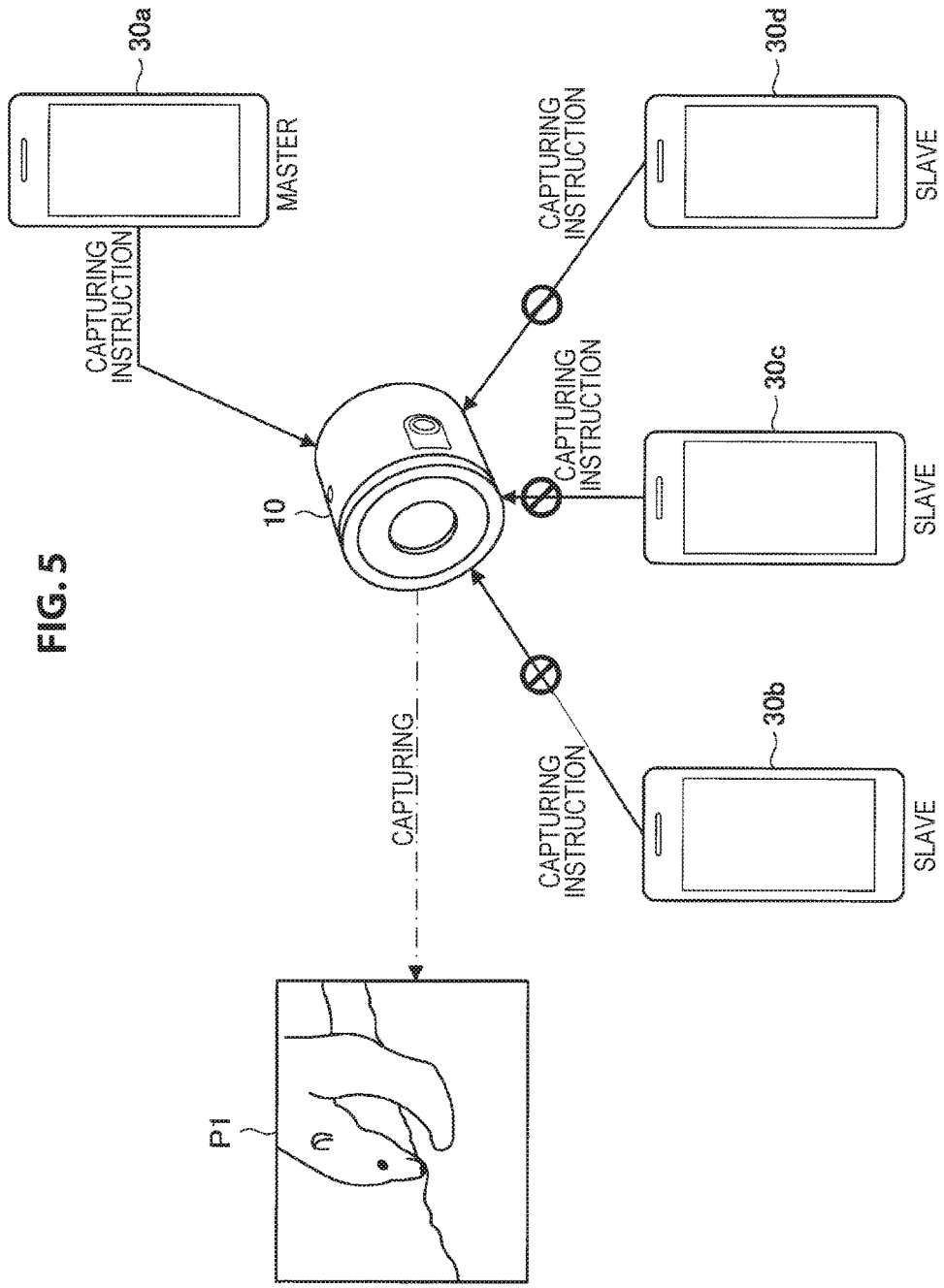
FIG. 5 is a diagram illustrated to describe an overview of the information processing system according to the present embodiment.

Specifically, in the information processing system according to the present embodiment, one of the information processing terminals 30a to 30d is set to serve as a "master" having higher priority than that of the others, as illustrated in FIG. 5. In the example illustrated in FIG. 5, the information processing terminal 30a is set to serve as a master. The information processing terminal 30 except for ones serving as a master of the information processing terminals 30a to 30d is referred to as a "slave" hereinafter.

The image capturing apparatus 10 regards only the instruction, which is transmitted from the information processing terminal 30a that is set to serve as a master of the information processing terminals 30a to 30d, as a target to be processed. The image capturing apparatus 10 regards the instructions from the other information processing terminals 30b to 30d that are slaves as a target that is not intended to be processed. This configuration makes it possible for the image capturing apparatus 10 to prevent the image capturing instructions from a plurality of the information processing terminals 30 from contending with each other.

A method of setting or identifying a master is not limited to a particular method as long as one of the information processing terminals 30a to 30d can be set to serve as a master and the image capturing apparatus 10 is capable of identifying the information processing terminal 30 that is set to serve as the master.

Figure 6:
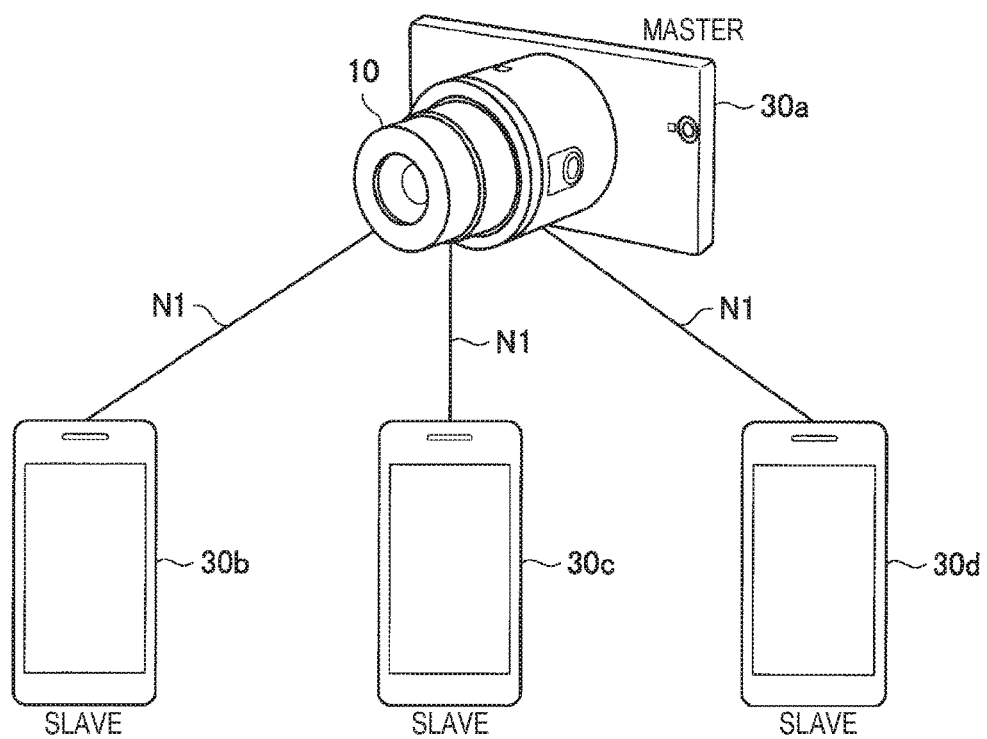
FIG. 6 is a schematic diagram illustrating another exemplary system configuration of the information processing system according to the present embodiment.

As one example, FIG. 6 is a schematic diagram illustrating another exemplary system configuration of the information processing system according to the present embodiment. In the example illustrated in FIG. 6, the image capturing apparatus 10 identifies the instruction, which is transmitted from the information processing terminal 30a attached to the image capturing apparatus 10 to be in close contact with each other of the information processing terminals 30a to 30d, as the instruction from a master.

Thus, the information processing system according to the present embodiment will be described in more detail by taking the configuration illustrated in FIG. 6 as an example, but another example of the method of setting a master or the method of identifying the master will be described later

Figure 7:
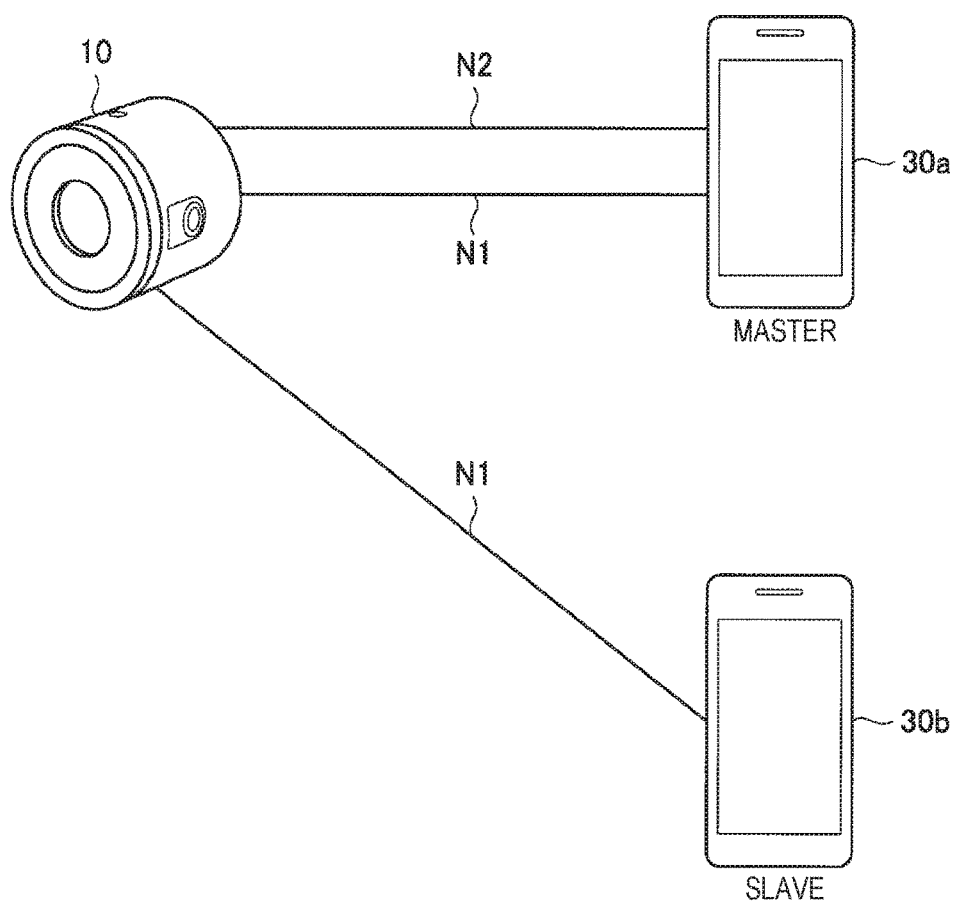
FIG. 7 is a diagram illustrated to describe an example of a method of identifying whether an image capturing apparatus and an information processing terminal are in close contact with each other.

1.2. Method of Identifying State where Image Capturing Apparatus and Information Processing Terminal are in Close Contact with Each Other An example of a method of identifying whether the image capturing apparatus 10 and the information processing terminal 30 are in close contact with each other will be described with reference to FIG. 7. FIG. 7 is a diagram illustrated to describe an example of a method of identifying whether an image capturing apparatus and an information processing terminal are in close contact with each other, and illustrates the connection relationship among the image capturing apparatus 10, the information processing terminal 30a serving as a master, and the information processing terminal 30b serving as a slave. In the example illustrated in FIG. 7, the information processing terminal 30a corresponds to the information processing terminal 30 that is attached to the image capturing apparatus 10 to be in close contact with each other. The information processing terminal 30b corresponds to another information processing terminal 30 that is not attached to the image capturing apparatus 10.

In the example illustrated in FIG. 7, the information processing terminal 30 and the image capturing apparatus 10 are configured to be capable of communicating with each other via another wireless network N2 in addition to the communication via the network N1. The network N2 has a communication range that is shorter than that of the network N1. The network N2 corresponds to a communication channel of so-called short-range wireless communication and its specific example includes a network based on the communication standard called near-field communication (NFC).

Such a configuration allows the information processing terminal 30a that is attached to the image capturing apparatus 10 in close contact with the image capturing apparatus 10 (i.e., positioned near the image capturing apparatus 10) to be communicable with the image capturing apparatus 10 via the network N2 in addition to the network N1 as illustrated in FIG. 7. While, the information processing terminal 30b that is not attached to the image capturing apparatus 10 (i.e., not positioned near the image capturing apparatus 10) fails to establish the network N2 with the image capturing apparatus 10, thereby making the communication with the image capturing apparatus 10 via the network N2 difficult.

In other words, the image capturing apparatus 10 and the information processing terminal 30a execute a predetermined communication sequence via the network N2, and thus they can recognize that the information processing terminal 30a is attached to the information processing terminal 30 in close contact with each other. The use of such a mechanism allows the instruction from the information processing terminal 30a attached to the information processing terminal 30 in close contact with each other to be identified as an instruction from a master.

As a specific example, a method that allows the information processing terminal 30a serving as the entity to recognize whether the information processing terminal 30a itself is in close contact with the image capturing apparatus 10 will be described.

In this case, the image capturing apparatus 10 transmits identification information, which is used to identify itself, to the information processing terminal 30a connected via the network N2. The information processing terminal 30a, when receiving the identification information used to identify the image capturing apparatus 10 from the image capturing apparatus 10 via the network N2, recognizes that information processing terminal 30a itself serves as a master.

The information processing terminal 30a, when instructing the image capturing apparatus 10 to capture an image via the network N1, associates the instruction with control information indicating that the information processing terminal 30a serves as a master (in other words, control information indicating its own priority). This makes it possible for the image capturing apparatus 10 to identify whether the instruction received from the information processing terminal 30a is the instruction from the master.

As another example, a method of identifying the instruction from the information processing terminal 30a attached to the image capturing apparatus 10 serving as the entity in close contact with each other will be described.

In this case, the information processing terminal 30a previously transmits the identification information used to identify itself to the image capturing apparatus 10 via the network N2. The information processing terminal 30a, when instructing the image capturing apparatus 10 to capture an image via the network N1, associates the instruction with its own identification information.

The image capturing apparatus 10, when receiving the image capturing instruction from the information processing terminal 30a via the network N1, compares the identification information associated with the image capturing instruction to the identification information obtained previously via the network N2. Then, if they coincide with each other from a result obtained by the comparison, the image capturing apparatus 10 can recognize the instruction received from the information processing terminal 30a as the instruction from the master.

An example of the method of identifying whether the image capturing apparatus 10 and the information processing terminal 30 are in close contact with each other has been described with reference to FIG. 7.

1.3. Functional Configuration

Figure 8:
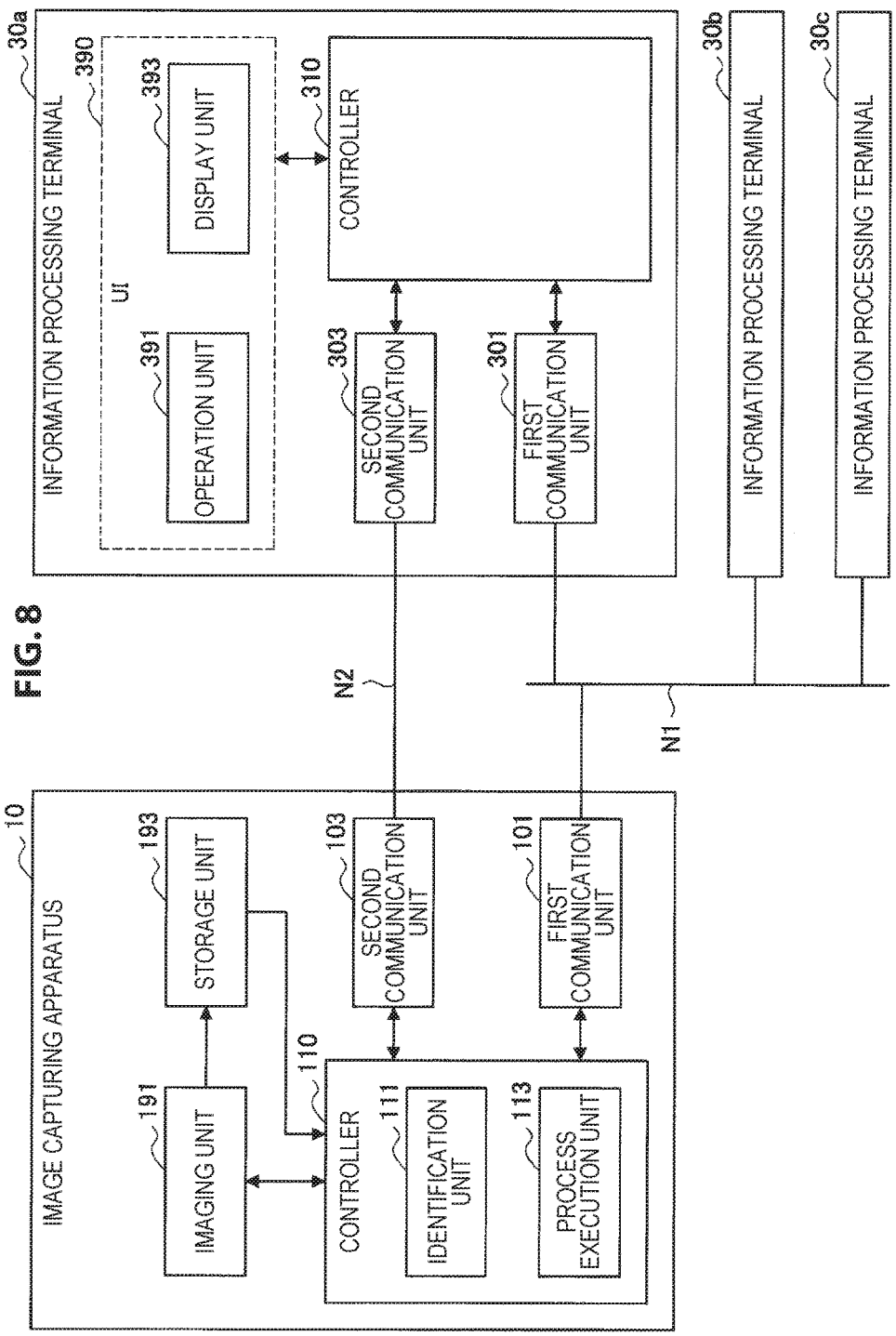
FIG. 8 is a block diagram illustrating an exemplary functional configuration of the information processing system according to the present embodiment.

An exemplary functional configuration of the information processing system according to the present embodiment will be described with reference to FIG. 8. FIG. 8 is a block diagram illustrating an exemplary functional configuration of the information processing system according to the present embodiment. This description will be given, as an example, by taking a case where the information processing terminal 30a attached to the image capturing apparatus 10 in close contact with each other is identified as a master, as illustrated in FIGS. 6 and 7.

As illustrated in FIG. 8, the image capturing apparatus 10 is configured to include a first communication unit 101, a second communication unit 103, a controller 110, an imaging unit 191, and a storage unit 193. The controller 110 is configured to include an identification unit 111 and a process execution unit 113. The information processing terminal 30 is configured to include a first communication unit 301, a second communication unit 303, a controller 310, and a user interface (UI) 390. The components included in the image capturing apparatus 10 described above may be implemented with a hardware circuit that constitutes the image capturing apparatus 10. The components included in the information processing terminal 30 described above may be similarly implemented with a hardware circuit that constitutes the information processing terminal 30.

The first communication unit 301 is a communication interface that allows each component in the information processing terminal 30 to communicate with the image capturing apparatus 10 via the wireless network N1. A specific example of the network N1 includes a Wi-Fi (registered trademark)-based network as described above.

In the information processing terminal 30, data transmission and reception with the image capturing apparatus 10 via the network N1 is assumed to be performed through the first communication unit 301 unless otherwise described.

The second communication unit 303 is a communication interface that allows each component in the information processing terminal 30 to communicate with the image capturing apparatus 10 via the wireless network N2 that is different from the network N1. A specific example of the network N2 includes a communication channel of so-called short-range wireless communication based on the communication standard such as NFC, as described above.

In the information processing terminal 30, data transmission and reception with the image capturing apparatus 10 via the network N2 is assumed to be performed through the second communication unit 303 unless otherwise described.

The first communication unit 301 and the second communication unit 303 may be configured on a single device (e.g., a chip) in an integrated manner. The first communication unit 301 and the second communication unit 303 may be configured as separate devices.

The UI 390 is a user interface that allows the user to operate the information processing terminal 30. The UI 390 may be configured to include an operation unit 391 and a display unit 393 as one example.

A specific example of the operation unit 391 includes an input device that allows the user to operate the information processing terminal 30, such as a button and a touch panel. A specific example of the display unit 393 includes an output device, such as a display device, which allows the information processing terminal 30 to present information to the user.

The controller 310 transmits the image capturing instruction to the image capturing apparatus 10 via the network N1 based on an instruction from the user via the UI 390. The controller 310 will be described in more detail later.

The first communication unit 101 is a communication interface that allows each component in the image capturing apparatus 10 to communicate with each information processing terminal 30 (for example, information processing terminals 30a to 30c) via the wireless network N1. A specific example of the network N1 includes a Wi-Fi (registered trademark)-based network as described above.

In the image capturing apparatus 10, data transmission and reception with each of the information processing terminal 30 via the network N1 is assumed to be performed through the first communication unit 101 unless otherwise described.

The second communication unit 103 is a communication interface that allows each component in the image capturing apparatus 10 to communicate with the information processing terminal 30a via the wireless network N2 that is different from the network N1. A specific example of the network N2 includes a communication channel of so-called short-range wireless communication such as NFC, as described above.

In the i image capturing apparatus 10, data transmission and reception with the information processing terminal 30a via the network N2 is assumed to be performed through the second communication unit 103 unless otherwise described.

The first communication unit 101 and the second communication unit 103 may be configured on a single device (e.g., a chip) in an integrated manner. The first communication unit 101 and the second communication unit 103 may be configured as separate devices.

The imaging unit 191 is provided with an image sensor, and captures an image such as a still or moving image of a photographic subject, based on an instruction, which will be described later, from the controller 110. This image sensor is an image pickup device that captures a photographic subject to obtain digital data of the captured image, such as a complementary metal-oxide-semiconductor (CMOS) image sensor and a charge-coupled device (CCD) image sensor. The imaging unit 191 may record the captured image in the storage unit 193. The imaging unit 191 may directly output the captured image to the controller 110.

The imaging unit 191 may capture an image based on the capturing condition instructed from the controller 110. A specific example of the capturing condition includes an exposure condition based on the aperture and shutter speed, the magnification ratio of optical zooming or digital zooming, ISO sensitivity, and white balance.

The imaging unit 191 may capture a so-called through-the-lens image (e.g., pixel-thinned image) and sequentially output the captured through-the-lens images to the controller 110, based on the instruction from the controller 110.

The storage unit 193 is a recording medium that is used to record the captured image. The storage unit 193 may be configured as a recording medium that is incorporated in the image capturing apparatus 10. The storage unit 193 may be configured as an external recording medium that is removably attached to the image capturing apparatus 10.

Although the exemplary configuration of the image capturing apparatus 10 including the imaging unit 191 therein is illustrated in the example of FIG. 8, the imaging unit 191 may be provided on the outside of the image capturing apparatus 10. Similarly, although the exemplary configuration of the image capturing apparatus 10 including the storage unit 193 therein is illustrated in the example of FIG. 8, the storage unit 193 may be provided on the outside of the image capturing apparatus 10. The device for controlling the operation of the imaging unit 191, that is, the image capturing apparatus 10 corresponds to an example of the "control apparatus".

The controller 110 receives the image capturing instruction from each of the information processing terminals 30 via the network N1 and controls the operation of the imaging unit 191 depending on whether a source of the received instruction is a master or a slave.

As described above, an entity that recognizes whether the information processing terminal 30 is in close contact with the image capturing apparatus 10, that is, whether the information processing terminal 30 is a master may be any one of the image capturing apparatus 10 (i.e., the identification unit 111) and the information processing terminal 30.

On the other hand, the operation of the controller 110 and the controller 310 varies depending on the identity of an entity, i.e., either the image capturing apparatus 10 or the information processing terminal 30, which recognizes whether the information processing terminal 30 is in close contact with the image capturing apparatus 10, that is, whether the information processing terminal 30 is a master. The description of each of the operations of the controller 110 and the controller 310 will be divided into two cases, "case of recognizing the information processing terminal as an entity to be a master" and "case of recognizing the image capturing apparatus as an entity to be a master".

1.3.1. Case of Recognizing Information Processing Terminal as Entity to be Master An example of the operation of the controller 110 and the controller 310 in the case where the information processing terminal 30 as an entity recognizes itself to be a master will be described.

When the communication between the controller 310 and the image capturing apparatus 10 is established via the network N2, a predetermined authentication process (communication sequence) is executed via the network N2 between the controller 310 and the image capturing apparatus 10, and thus the controller 310 recognizes whether the information processing terminal 30a that is provided with the controller 310 is a master.

More specifically, the controller 310 acquires the identification information, which is used to identify the image capturing apparatus 10, from the image capturing apparatus 10 via the network N2. When the identification information can be acquired, the controller 310 recognizes the information processing terminal 30a provided with the controller 310 as a master. When the identification information fails to be acquired, the controller 310 may recognize the information processing terminal 30a as a slave. A specific example of the case where the identification information fails to be acquired includes a case where the side of the image capturing apparatus 10 does not support the authentication process (communication sequence) described above.

When the communication with the image capturing apparatus 10 via the network N2 is disconnected, the controller 310 recognizes the information processing terminal 30a provided with the controller 310 as a slave.

In this way, the controller 310 recognizes whether the information processing terminal 30a provided with the controller 310 is a master.

The controller 310 transmits the image capturing instruction to the image capturing apparatus 10 via the network N1 based on an instruction from the user using the UI 390. In this case, the controller 310 associates the control information indicating whether the information processing terminal 30a is a master (i.e., the control information indicating the priority) with the image capturing instruction and transmits the instruction to the image capturing apparatus 10. This makes it possible for the image capturing apparatus 10 to identify whether the information processing terminal 30 serving as a source for transmission of the instruction corresponds to a master or a slave.

The timing at which the controller 310 executes the authentication process described above is not limited to a particular one as long as whether the information processing terminal 30a is a master can be recognized until the image capturing instruction is transmitted to the image capturing apparatus 10.

As a specific example, the controller 310 may execute the authentication process described above at each time of predetermined timing. As another example, the controller 310 may execute the authentication process described above when the network N2 is established. The controller 310 may execute the authentication process described above when the network N2 is established. The controller 310 may recognize the information processing terminal 30a as a slave when the disconnection of the network N2 is detected.

The controller 310 may acquire the captured image (or, the through-the-lens image), which is obtained by the process based on the image capturing instruction, from the image capturing apparatus 10 via the network N1. The controller 310 may acquire the image, which is captured based on the instruction from another information processing terminal 30, from the image capturing apparatus 10 via the network N1. When an image is acquired from the image capturing apparatus 10, the controller 310 may present the acquired image to the user via the UI 390. The controller 310 may store the acquired image in a storage unit (not shown) of the information processing terminal 30.

Each of the components of the controller 110 will be described.

The identification unit 111 executes a predetermined authentication process (communication sequence) with respect to the information processing terminal 30a via the network N2, based on a request from the information processing terminal 30a connected thereto via the network N2. In this case, identification unit 111 transmits the identification information used to identify the image capturing apparatus 10 to the information processing terminal 30a connected thereto via the network N2. The information processing terminal 30a, when receiving this identification information, recognizes itself as a master, and associates control information indicating that the information processing terminal 30a is the master with the image capturing instruction when the image capturing instruction is transmitted to the image capturing apparatus 10 via the network N1.

The identification unit 111 identifies whether the image capturing instruction is an instruction from the master depending on whether the control information indicating that it is the master is associated with the image capturing instruction received from the each of the information processing terminals 30. Then, the identification unit 111 outputs a result obtained by the identification to the process execution unit 113.

The process execution unit 113 acquires a result obtained by identifying the image capturing instruction received via the network N1, that is, an identification result, which indicates whether it is the instruction from the master, from the identification unit 111. Then, the process execution unit 113 controls the operation of the imaging unit 191 depending on the acquired identification result.

More specifically, if the received instruction is the instruction from the master, the process execution unit 113 according to the present embodiment causes the imaging unit 191 to execute a process corresponding to the instruction.

As one example, the process execution unit 113 may instruct the imaging unit 191 to capture an image or acquire a through-the-lens image, based on the instruction received via the network N1.

As a specific example, the process execution unit 113, when receiving the image capturing instruction via the network N1, causes the imaging unit 191 to capture an image based on the instruction. In this case, the process execution unit 113 acquires the captured image from the imaging unit 191 and may output the acquired image to each of the information processing terminals 30 (e.g., information processing terminals 30a to 30c) via the network N1. The process execution unit 113 may acquire the captured image directly from the imaging unit 191, or may read the image recorded in the storage unit 193.

The process execution unit 113, when receiving the instruction to output the through-the-lens image via the network N1, causes the imaging unit 191 to capture the through-the-lens image based on the instruction. Then, the process execution unit 113 sequentially acquires the captured through-the-lens images from the imaging unit 191 and outputs the acquired through-the-lens image to each of the information processing terminals 30 via the network N1.

On the other hand, if the received instruction is not the instruction from the master, that is, if it is an instruction from a slave, the process execution unit 113 does not regard the instruction as a target to be processed. Even when image capturing instructions from a plurality of the information processing terminals 30 are received, this configuration described above makes it possible for the process execution unit 113 to prevent contention between the instructions.

1.3.2. Case of Recognizing Image Capturing Apparatus as Entity to be Master

An example of the operations of the controller 110 and the controller 310 in the case where the image capturing apparatus 10 as an entity recognizes itself to be a master will be described.

When the communication is established between the controller 310 and the image capturing apparatus 10 via the network N2, the controller 310 executes a predetermined authentication process (communication sequence) with the image capturing apparatus 10 via the network N2. In this case, the controller 310 notifies the image capturing apparatus 10 of the identification information of the information processing terminal 30 provided with the controller 310 via the network N2. This makes it possible for the image capturing apparatus 10 to recognize the identification information of the information processing terminal 30 connected thereto via the network N2.

The controller 310 transmits the image capturing instruction to the image capturing apparatus 10 via the network N1 based on the instruction from the user via the UI 390. In this case, the controller 310 associates the identification information of the information processing terminal 30 provided with the controller 310 with the image capturing instruction and transmits the instruction to the image capturing apparatus 10. This makes it possible for the image capturing apparatus 10 to recognize the identification information of the information processing terminal 30 that is a source for transmission of the instruction.

The controller 310 may acquire the captured image (or the through-the-lens image) from the image capturing apparatus 10 via the network N1 as a result of the process based on the image capturing instruction. The operation in this case is similar to the "case of recognizing the information processing terminal as an entity to be a master" described above, and hence the detailed description thereof is omitted.

Each of the components of the controller 110 will be described.

The identification unit 111 executes a predetermined authentication process (communication sequence) with the information processing terminal 30a via the network N2, based on a request from the information processing terminal 30a connected thereto via the network N2. In this time, the identification unit 111 acquires the identification information of the information processing terminal 30a via the network N2 previously from the information processing terminal 30a.

When the image capturing instruction is received from each of the information processing terminals 30 via the network N1, the identification unit 111 acquires the identification information of the information processing terminal 30 that is associated with the instruction. The identification unit 111 compares the acquired identification information to the identification information acquired previously via the network N2, and identifies whether the instruction associated with the identification information is the instruction from the master depending on whether they coincide with each other from a result obtained by the comparison. Then, the identification unit 111 outputs a result obtained by the identification to the process execution unit 113.

The process execution unit 113 acquires a result obtained by identifying the image capturing instruction received via the network N1, that is, an identification result, which indicates whether it is the instruction from the master, from the identification unit 111. Then, the process execution unit 113 controls the operation of the imaging unit 191 depending on the acquired identification result. The operation executed by the process execution unit 113 is similar to the "case of recognizing the information processing terminal as an entity to be a master" described above, and hence the detailed description thereof is omitted.

An exemplary functional configuration of the information processing system according to the present embodiment has been described with reference to FIG. 8.

1.4. Processing

An example of a series of processing procedures of the information processing system according to the present embodiment will be described. The description will be divided into three processes, "processing of recognizing information processing terminal as entity to be master", "processing of recognizing image capturing apparatus as entity to be master", and "processing for image capturing".

Figure 9:
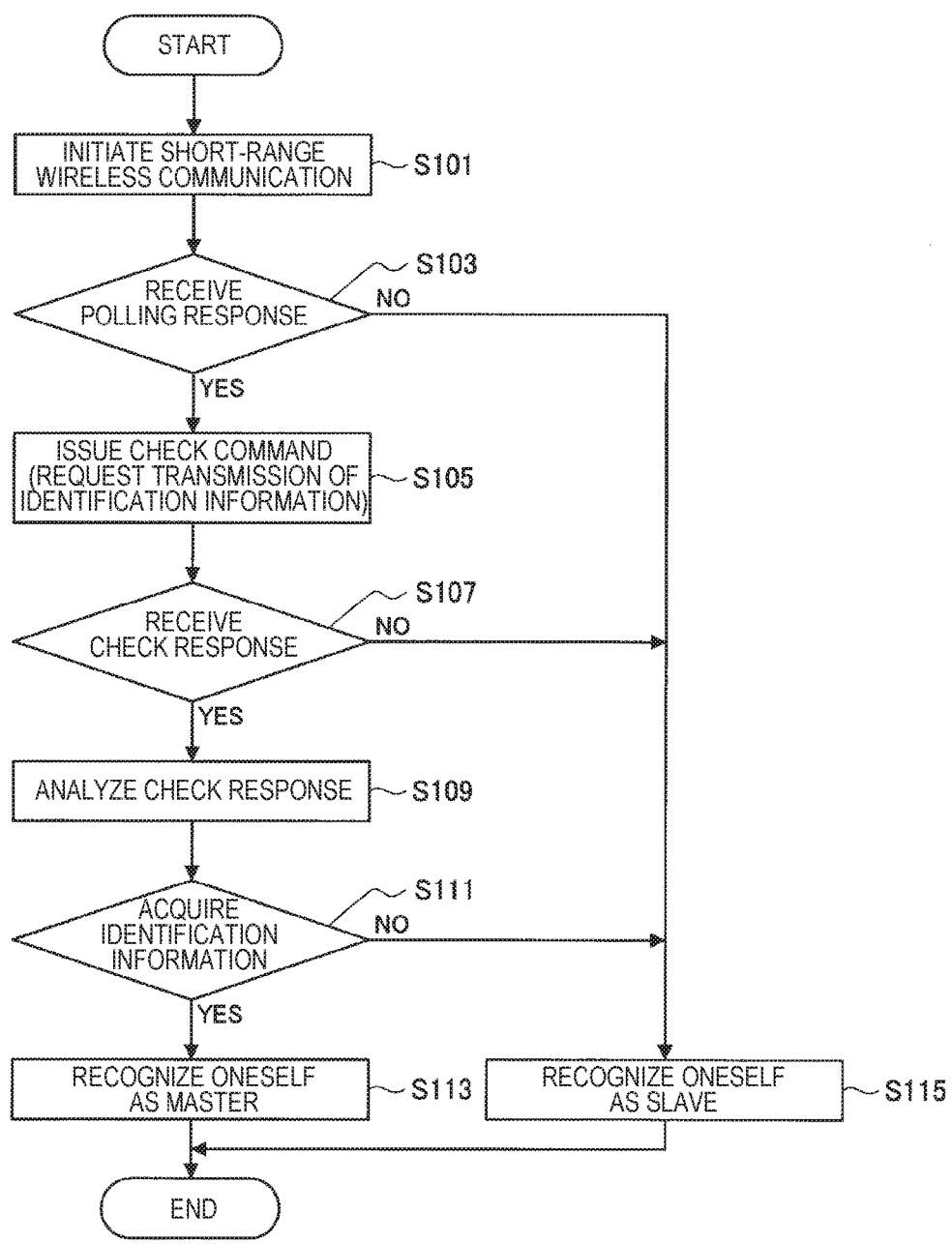
FIG. 9 is a flowchart illustrated to describe an exemplary processing procedure of the information processing system according to the present embodiment.

1.4.1. Processing of Recognizing Information Processing Terminal as Entity to be Master An exemplary processing procedure of recognizing the information processing terminal 30 as an entity to be master will be described with reference to FIG. 9. FIG. 9 is a flowchart illustrated to describe an exemplary processing procedure of the information processing system according to the present embodiment, and illustrates the procedure of the processing executed by the information processing terminal 30 in the case of recognizing the information processing terminal 30 as an entity to be master.

(Step S101)

If the communication with the image capturing apparatus 10 is established via the network N2, the controller 310 of the information processing terminal 30 executes a predetermined authentication process (communication sequence) with the image capturing apparatus 10 via the network N2. More specifically, the controller 310 transmits control information used for alive monitoring of the image capturing apparatus 10, which is called "polling command", to the image capturing apparatus 10 via the network N2.

(Steps S103 and S115)

If control information called "polling response" as a response to the transmitted polling command fails to be received from the image capturing apparatus 10 (NO in step S103), the controller 310 recognizes the information processing terminal 30 provided with the controller 310 as a slave (step S115). An example of the case where a polling response fails to be received includes a case where the image capturing apparatus 10 is not within the communication range via the network N2 of the information processing terminal 30 and the network N2 is disconnected (i.e., the information processing terminal 30 and the image capturing apparatus 10 are separated) and a case where there is no response from the image capturing apparatus 10.

(Step S105)

If the polling response is received from the image capturing apparatus 10 (YES in step S103), the controller 310 requests the image capturing apparatus 10 to transmit the identification information of the image capturing apparatus 10 by transmitting the control information called "check command" to the image capturing apparatus 10 via the network N2.

(Steps S107 and S115)

If control information called "check response" as a response to the check command transmitted fails to be received from the image capturing apparatus 10 (NO in step S107), the controller 310 recognizes the information processing terminal 30 provided with the controller 310 as a slave (step S115). An example of the case where a check response fails to be received includes a case where the image capturing apparatus 10 does not support the authentication process (communication sequence) based on the check command described above, that is, a case where the image capturing apparatus 10 is different from the image capturing apparatus 10 according to the present embodiment.

(Step S109)

If the check response is received from the image capturing apparatus 10 (YES in step S107), the controller 310 analyzes the received check response to extract the identification information of the image capturing apparatus 10 from the check response.

(Steps S111 and S113)

If the identification information of the image capturing apparatus 10 is extracted from the check response (YES in step S111), the controller 310 recognizes the information processing terminal 30 provided with the controller 310 as a master.

(Steps S111 and S115)

On the other hand, if the identification information of the image capturing apparatus 10 fails to be extracted from the check response (NO in step S111), the controller 310 recognizes the information processing terminal 30 provided with the controller 310 as a slave (step S115).

In this way, the controller 310 recognizes that whether the information processing terminal 30 provided with the controller 310 corresponds to a master or a slave, by executing the above-described predetermined authentication process (communication sequence) with the image capturing apparatus 10 via the network N2. The controller 310, when transmitting the image capturing instruction to the image capturing apparatus 10 via the network N1, associates the instruction with control information indicating whether the information processing terminal 30 is a master or not. This makes it possible for the image capturing apparatus 10 to identify that whether the information processing terminal 30 that is a source for transmission of the instruction corresponds to a master or a slave.

The controller 310 may monitor the state of connection between the information processing terminal 30 and the image capturing apparatus 10 via the network N2 by transmitting the polling command to the image capturing apparatus 10 at each time of predetermined timing. In this time, when the connection between the information processing terminal 30 and the image capturing apparatus 10 via the network N2 is checked, the controller 310 may check again whether the information processing terminal 30 is a master or not by transmitting another check command to the image capturing apparatus 10.

An exemplary processing procedure of recognizing the information processing terminal 30 as an entity to be master has been described with reference to FIG. 9.

Figure 10:
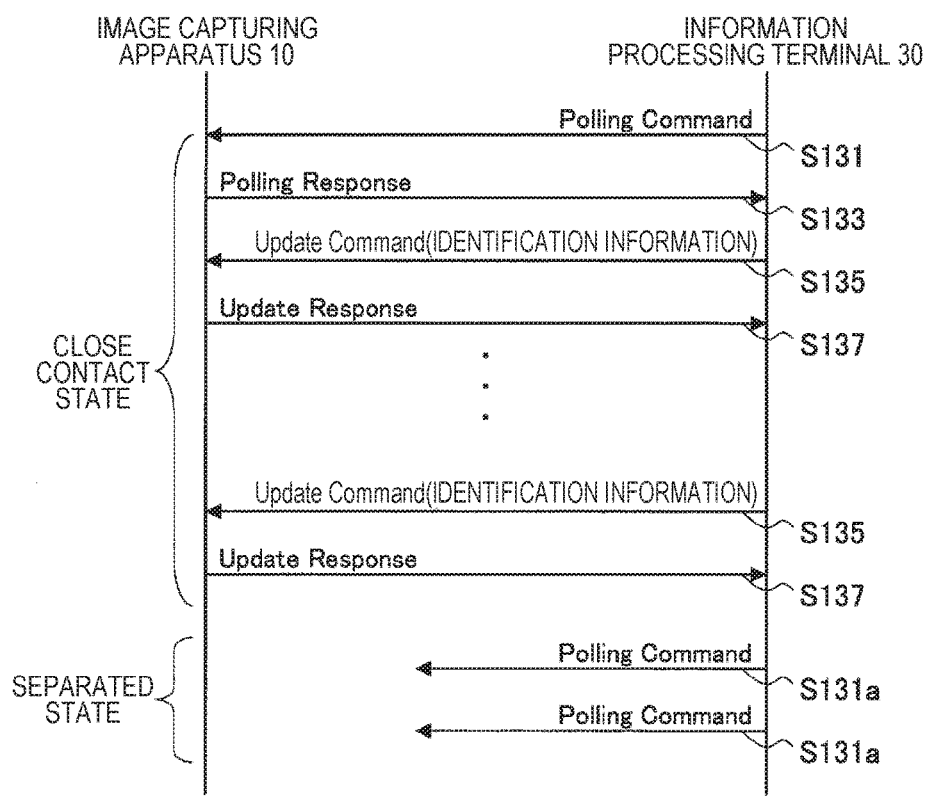
FIG. 10 is a sequence diagram illustrated to describe an exemplary processing procedure of the information processing system according to the present embodiment.

1.4.2. Processing of Recognizing Image Capturing Apparatus as Entity to be Master An exemplary processing procedure of recognizing the image capturing apparatus 10 as an entity to be master will be described with reference to FIGS. 10 and 11. FIG. 10 is a sequence diagram illustrated to describe an exemplary processing procedure of the information processing system according to the present embodiment, and illustrates an example of the authentication process (communication sequence) via the network N2 in the case of recognizing the image capturing apparatus as an entity to be a master.

(Step S131)

If the communication with the image capturing apparatus 10 is established via the network N2, the controller 310 of the information processing terminal 30 executes a predetermined authentication process (communication sequence) with the image capturing apparatus 10 via the network N2. More specifically, the controller 310 transmits polling command to the image capturing apparatus 10 via the network N2.

(Step S133)

As a response to the transmitted polling command, the controller 310 receives a polling response from the image capturing apparatus 10. As shown in step S131a, if there is no response to the polling command, that is, when a polling response fails to be received from the image capturing apparatus 10, the controller 310 recognizes the information processing terminal 30 provided with the controller 310 as a slave. An example of the case where a polling response fails to be received includes a case where the image capturing apparatus 10 is not within the communication range via the network N2 of the information processing terminal 30 and the network N2 is disconnected (i.e., the information processing terminal 30 and the image capturing apparatus 10 are separated) and a case where there is no response from the image capturing apparatus 10.

(Step S135)

When the polling response is received from the image capturing apparatus 10, the controller 310 transmits the identification information of the information processing terminal 30 to the image capturing apparatus 10 by transmitting control information called "update command" to the image capturing apparatus 10 via the network N2. This makes it possible for the image capturing apparatus 10 to identify the information processing terminal 30 that is connected via the network N2 of a plurality of the information processing terminals 30 connected via the network N1.

(Step S137)

As a response to the transmitted update command, the controller 310 receives the control information called "update response" from the image capturing apparatus 10. This makes it possible for the controller 310 to recognize that the identification information of the information processing terminal 30 is successfully transmitted to the image capturing apparatus 10. If the update response fails to be received, the controller 310 may recognize the information processing terminal 30 provided with the controller 310 as a slave. An example of the case where the update response fails to be received includes a case where the side of the image capturing apparatus 10 does not support the authentication process (communication sequence) based on the update command described above.

As described above, when the communication with the image capturing apparatus 10 is established via the network N2, the controller 310 transmits the identification information of the information processing terminal 30 provided with the controller 310 to the image capturing apparatus 10 via the network N2.

The controller 310 may monitor the state of connection between the information processing terminal 30 and the image capturing apparatus 10 via the network N2 by transmitting the polling command to the image capturing apparatus 10 at each time of predetermined timing. In this time, when the connection between the information processing terminal 30 and the image capturing apparatus 10 via the network N2 is checked, the controller 310 may transmit again the identification information of the information processing terminal 30 to the image capturing apparatus by transmitting another update command to the image capturing apparatus 10.

Figure 11:
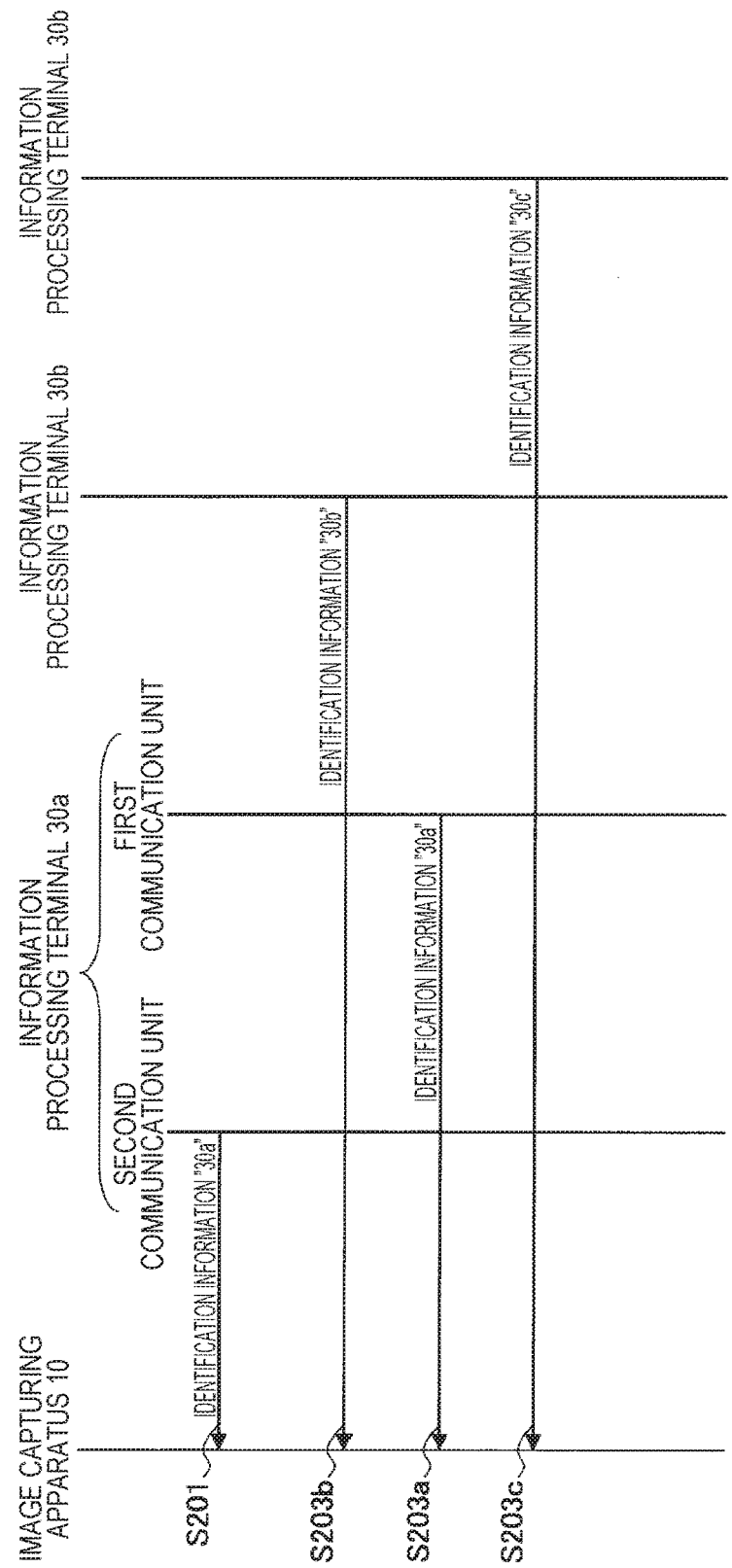
FIG. 11 is a sequence diagram illustrated to describe an exemplary processing procedure of the information processing system according to the present embodiment.

The processing procedure of recognizing that whether a source for transmission of the image capturing instruction is a master or a slave when the image capturing apparatus 10 receives the image capturing instruction from each of the information processing terminals 30 via the network N1 will be described with reference to FIG. 11. FIG. 11 is a sequence diagram illustrated to describe an exemplary processing procedure of the information processing system according to the present embodiment, and illustrates the procedure of a process of recognizing, by the image capturing apparatus 10, that whether a source for transmission of the received instruction is a master or a slave. In FIG. 11, it is assumed that the information processing terminal 30a is attached to the image capturing apparatus 10 in close contact with each other of the information processing terminals 30a to 30c, that is, the information processing terminal 30a and the image capturing apparatus 10 are connected via the network N2.

(Step S201)

As described above with reference to FIG. 10, when the communication with the information processing terminal 30a is established via the network N2, the identification unit 111 of the image capturing apparatus 10 executes the predetermined authentication process (communication sequence) with the information processing terminal 30a via the network N2. This allows the identification unit 111 to acquire previously the identification information of the information processing terminal 30a from the information processing terminal 30a via the network N2.

(Steps S203a to 203c)

The controller 310 of each of the information processing terminals 30 transmits the image capturing instruction to the image capturing apparatus 10 via the network N1 based on an instruction from the user via the UI 390. In this time, the controller 310 associates the identification information of the information processing terminal 30 provided with the controller 310 with the image capturing instruction, and transmits the instruction to the image capturing apparatus 10.

When the image capturing instruction is received from each of the information processing terminals 30 via the network N1, the identification unit 111 acquires the identification information of the information processing terminal 30 that is associated with the instruction. The identification unit 111 compares the acquired identification information to the identification information acquired previously via the network N2, and identifies whether the instruction associated with the identification information is the instruction from the master depending on whether they coincide with each other from a result obtained by the comparison.

In the example illustrated in FIG. 11, the identification unit 111 acquires previously the identification information of the information processing terminal 30a as described above. Thus, the identification information that is associated with the image capturing instruction transmitted from the information processing terminal 30a via the network N1 coincides with the identification information acquired previously via the network N2 by the identification unit 111. In other words, the identification unit 111 identifies the instruction transmitted from the information processing terminal 30a as the instruction from a master (step S203a).

On the other hand, the identification information that is associated with the image capturing instruction transmitted from each of the information processing terminals 30b and 30c via the network N1 does not coincide with the identification information acquired previously via the network N2 by the identification unit 111. Thus, the identification unit 111 identifies the instruction transmitted from each of the information processing terminals 30a and 30c as the instruction from a slave (steps S203b and S203c).

The configuration as described above makes it possible for the image capturing apparatus 10 to identify whether the information processing terminal 30 serving as a source for transmission of the image capturing instruction corresponds to a master or a slave.

An exemplary processing procedure of recognizing the image capturing apparatus 10 as an entity to be master has been described with reference to FIGS. 10 and 11.

1.4.3. Processing for Image Capturing

Figure 12:
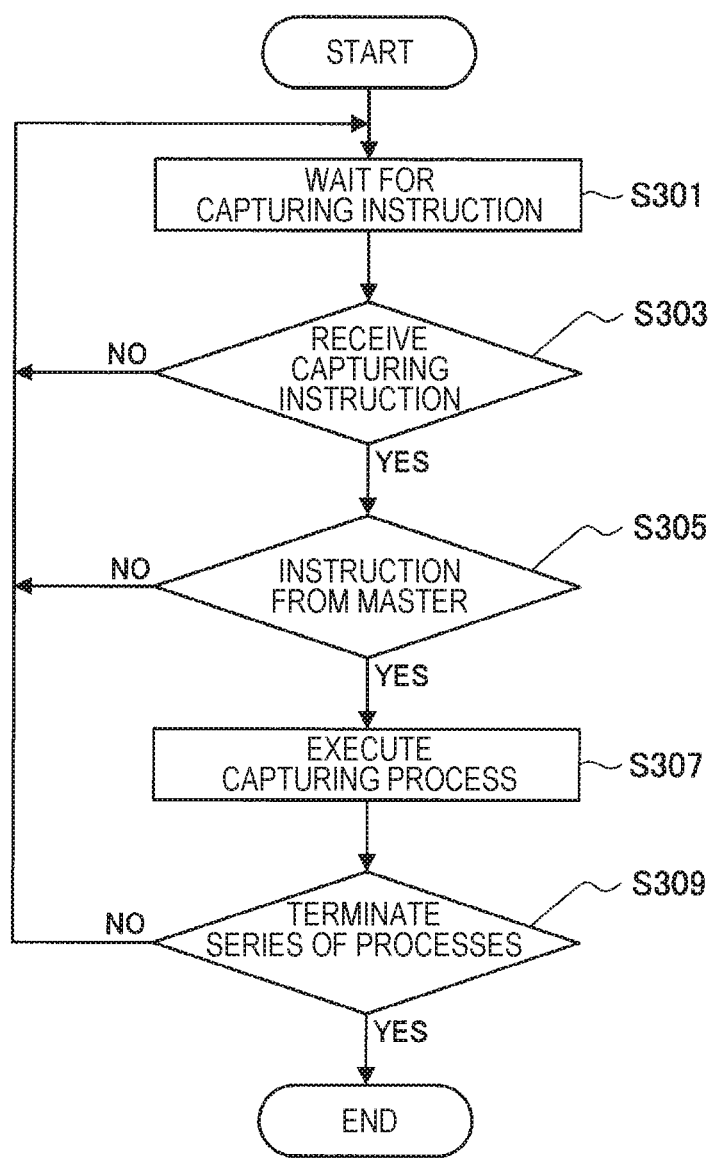
FIG. 12 is a flowchart illustrated to describe an exemplary processing procedure of the information processing system according to the present embodiment.

A series of processing procedures for image capturing by the image capturing apparatus 10 according to the present embodiment will be described with reference to FIG. 12. FIG. 12 is a flowchart illustrated to describe an exemplary processing procedure of the information processing system according to the present embodiment, and illustrates an example of a series of processing procedures for image capturing by the image capturing apparatus 10.

(Steps S301 and S303)

The image capturing apparatus 10, when establishing communication with each of the information processing terminals 30 via the network N1, waits for the image capturing instruction from each of the information processing terminals 30 (NO in step S303). When the communication between the image capturing apparatus 10 and one of the information processing terminals 30 is established via the network N2, the communication sequence described above is previously executed between the relevant information processing terminal 30 and the image capturing apparatus 10. This allows the information processing terminal 30 connected via the network N2 to be set as a master with respect to the image capturing apparatus 10.

(Steps S303 and S305)

If the image capturing instruction is received from the information processing terminal 30, the identification unit 11 of the image capturing apparatus 10 identifies whether the received instruction is the instruction transmitted from a master or a slave, and notifies the process execution unit 113 of a result obtained by the identification. The method of identification is substantially similar to that descried above.

If the received instruction is the instruction from a slave (NO in step S305), the process execution unit 113 regards the instruction as a target that is not intended to be processed. In this case, the image capturing apparatus 10 waits for another image capturing instruction again.

(Steps S305 and S307)

If the received instruction is the instruction from a master (NO in step S305), the process execution unit 113 causes the imaging unit 191 to execute a process corresponding to the instruction.

As a specific example, when the image capturing instruction is received via the network N1, the process execution unit 113 causes the imaging unit 191 to capture an image based on the instruction. In this time, the process execution unit 113 may acquire the captured image from the imaging unit 191 and may output the acquired image to each of the information processing terminals 30 via the network N1. The process execution unit 113 may acquire the captured image directly from the imaging unit 191, or may read the image recorded in the storage unit 193.

The process execution unit 113, when receiving the instruction to output the through-the-lens image via the network N1, causes the imaging unit 191 to capture the through-the-lens image based on the instruction. Then, the process execution unit 113 sequentially acquires the captured through-the-lens images from the imaging unit 191 and outputs the acquired through-the-lens image to each of the information processing terminals 30 via the network N1.

(Step S309)

The image capturing apparatus 10 executes the processes described above until the completion of the series of processes is instructed from the user (e.g., until an instruction is made to turn off the power) (NO in step S309). In other words, the image capturing apparatus 10 terminates the series of processes described above, based on a termination instruction from the user (YES in step S309).

A series of processing procedures for image capturing by the image capturing apparatus 10 according to the present embodiment have been described with reference to FIG. 12. As described above, the image capturing apparatus 10 according to the present embodiment regards only an instruction from the information processing terminal 30 that is set as a master of a plurality of the information processing terminals 30 as a target to be processed, but regards an instruction from other information processing terminals 30 that are slaves as a target that is not intended to be processed. This configuration makes it possible for the image capturing apparatus 10 to prevent image capturing instructions from each of the information processing terminals 30 from contending with each other.

1.5. Modifications

1.5.1. Modification (1): Example of Method of Identifying Master

In the embodiments described above, an example in which the information processing terminal 30 attached to the image capturing apparatus 10 to be in close contact with each other is set as a master has been described. However, as long as any one of a plurality of the information processing terminals 30 can be set as a master, the method of setting thereof or the method of identifying the master is not limited to particular ones. An example of the method of setting of the information processing terminal 30 serving as a master or the method of identifying the master will be described as the modification (1).

As one example, even when a master is set by executing the predetermined authentication process (communication sequence) via the network N2 as described in the above embodiments, the information processing terminal 30 is not necessarily attached to the image capturing apparatus 10 to be in close contact with each other all the time. As a specific example, the image capturing apparatus 10, when receiving the image capturing instruction from each of the information processing terminals 30 via the network N1, may identify the information processing terminal 30 that executes the authentication process via the network N2 as a master immediately before reception of the instruction.

An example of the network N2 used to execute the predetermined authentication process (communication sequence) for setting a master is not limited to short-range wireless communication such as NFC, but may be also applied to a network based on other communication standards. As a specific example, a wireless communication network based on the communication standard such as Bluetooth (registered trademark) and ZigBee (registered trademark) may be applied as the network N2.

The authentication process executed to set a master between the image capturing apparatus 10 and the information processing terminal 30 is not limited to the methods described in the above embodiments. As a specific example, the image capturing apparatus 10 and the information processing terminal 30 both may execute a predetermined operation (e.g., depression of a button) like so-called Wi-Fi protected setup-push button configuration (WPS-PBC). This allows the image capturing apparatus 10 and the information processing terminal 30 to recognize the information processing terminal 30 on which the operation is performed as a master from each other.

In this way, as long as there is a method in which the image capturing apparatus 10 and the information processing terminal 30 are recognizable from each other by executing a predetermined communication sequence, the method is not limited to a particular one. As one example, by using a method referred to as the so-called Bump, a predetermined communication sequence may be executed between the image capturing apparatus 10 and the information processing terminal 30. More specifically, the image capturing apparatus 10 and the information processing terminal 30 are both provided with an acceleration sensor or a vibration sensor, and when they are located close to each other, they may recognize each other depending on a result obtained by detection performed by the sensor of each of them, thereby setting a master.

In the above embodiments, the identification of whether the image capturing apparatus 10 and the information processing terminal 30 are in close contact with each other is performed based on the authentication process (communication sequence) via the network N2. On the other hand, if the image capturing apparatus 10 and the information processing terminal 30 can identify that they are in close contact with each other, the method is not necessarily limited to the method based on the authentication process via the network N2. As a specific example, either or both of the image capturing apparatus 10 and the information processing terminal 30 may be provided with a sensor or a switch, and the image capturing apparatus 10 and the information processing terminal 30 may identify whether they are in close contact with each using the sensor or the switch.

Alternatively, the information processing terminal 30 that is located nearest to the image capturing equipment 10 may be set as a master. In this case, as one example, the image capturing apparatus 10 may measure directly or indirectly the distance with each of the information processing terminals 30 and may specify the information processing terminal 30 serving as a master depending on a result obtained by the measurement. An example of a method of measuring the distance includes a method of estimating the distance (position) based on the radio field intensity, which is defined by the Bluetooth (registered trademark) standard.

When the information processing terminal 30 serving as a master is set depending on the positional relationship between the image capturing apparatus 10 and the information processing terminal 30, an entity that analyzes the positional relationship is not limited to a particular one. As one example, at least one of the image capturing apparatus 10 and each of the information processing terminals 30 may analyze the positional relationship. As another example, other than the image capturing apparatus 10 and each of the information processing terminals 30, a separate device for analyzing the positional relationship between the image capturing apparatus 10 and each of the information processing terminals 30 may be provided.

The method of analyzing the positional relationship between the image capturing apparatus 10 and each of the information processing terminals 30 is certainly not limited to the method based on the radio field intensity. As a specific example, the positional relationship between the image capturing apparatus 10 and each of the information processing terminals 30 may be analyzed using various types of sensors. As another example, the positional relationship between the image capturing apparatus 10 and each of the information processing terminals 30 may be analyzed by capturing an image of the image capturing apparatus 10 and each of the information processing terminals 30 and analyzing the image.

When a condition in which its state is changed continuously in a variable way is used to set a master like the positional relationship between the image capturing apparatus 10 and the information processing terminal 30, the setting of a master may be performed if the state is kept over a predetermined period of time. As a specific example, when the information processing terminal 30 is positioned over a predetermined period of time within a predetermined range starting from the position of the image capturing apparatus 10, the information processing terminal 30 may be a target to be set as a master.

The information processing terminal 30 to be set as a master may be changed sequentially. As a specific example, when the information processing terminal 30b different from the information processing terminal 30a executes the master setting process described above in a state where the information processing terminal 30a is set as a master, the information processing terminal 30b may be set as a master in the process and the subsequent processes.

As another example, on the basis of the user operation through the information processing terminal 30a that is set as a master, another information processing terminal 30 specified by the operation may be capable of being set as a new master. In this case, after the setting of a new master, the information processing terminal 30a is certainly recognized as a slave.

The change of a master described above may be temporary. As a specific example, when the information processing terminal 30b that is set as a new master instructs the image capturing apparatus 10 to capture an image, after the execution of the instruction, the information processing terminal 30a that is set as a master before the change may be reset as a master again.

An example of the method of setting of the information processing terminal 30 serving as a master or the method of identifying the master has been described as the modification (1).

1.5.2. Modification (2): Operation of Case where Plurality of Image Capturing Apparatus are Provided In the above embodiments, the communication mode in which a plurality of the information processing terminals 30 are connected to one image capturing apparatus 10 via the wireless network N1 has been described. On the other hand, a plurality of the image capturing apparatus 10 may be provided and a plurality of the information processing terminals 30 may be connected to each of a plurality of the image capturing apparatus 10. Thus, as the modification (2), an exemplary operation of the case in which a plurality of the information processing terminals 30 are connected to each of a plurality of the image capturing apparatus 10 via the wireless network N1 will be described.

When a plurality of the image capturing apparatus 10 are provided, as one example, each of the image capturing apparatus 10 may be caused to be operated as a so-called parent device (e.g., an access point) and each of the information processing terminals 30, which may be caused to be served as a so-called child device (e.g., a station), connected to each of the image capturing apparatus 10. Such a configuration makes it possible for a plurality of the information processing terminals 30 to be connected to each of a plurality of the image capturing apparatus 10 via the wireless network N1.

When a plurality of the information processing terminals 30 are connected to each of a plurality of the image capturing apparatus 10, in each of the image capturing apparatus 10, the information processing terminals 30 serving as a master may be capable of being set individually. In this case, the master setting process described above may be executed in each of the image capturing apparatus 10, and each of the image capturing apparatus 10 may identify the information processing terminal 30 serving as a master individually and independently.

As another example, the setting of the information processing terminal 30 serving as a master may be shared among a plurality of the image capturing apparatus 10. As a specific example, the execution of a predetermined communication sequence between one image capturing apparatus 10 and the information processing terminal 30a allows the information processing terminal 30a to be set as a master in the one image capturing apparatus 10. In this case, the one image capturing apparatus 10 may transmit the setting of the information processing terminal 30 serving as a master to another image capturing apparatus 10, and thus the information processing terminal 30a can be set as a master in conjunction with the other image capturing apparatus 10. Even when the master is intended to be changed, the changed setting of a master may be similarly shared among a plurality of the image capturing apparatus 10.

An exemplary operation of the case in which a plurality of the information processing terminals 30 are connected to each of a plurality of the image capturing apparatus 10 via the wireless network N1 has been described as the modification (2).

1.6. Conclusion

As described above, in the information processing system according to the present embodiment, one of a plurality of the information processing terminals 30 that are connected to the image capturing apparatus 10 via the wireless network N1 is set as a master that has higher priority than that of the others. The image capturing apparatus 10 regards only the instruction from the information processing terminal 30 that is set to serve as a master of a plurality of the information processing terminals 30 as a target to be processed. The image capturing apparatus 10 regards the instructions from the other information processing terminals 30 that are slaves as a target that is not intended to be processed. This configuration makes it possible for the information processing system according to the present embodiment to prevent the image capturing instructions from a plurality of the information processing terminals 30 to the image capturing apparatus 10 from contending with each other.

2. SECOND EMBODIMENT

In the first embodiment described above, the image capturing instructions from a plurality of the information processing terminals 30 are prevented from contending with each other in the image capturing apparatus 10 by regarding only the instruction from the information processing terminal 30 that is set to serve as a master as a target to be processed. On the other hand, if an instruction from one information processing terminal 30 is not a target to be processed during the execution of the process based on the instruction on the basis of the instruction from another information processing terminal 30 by the image capturing apparatus 10, the instructions from a plurality of the information processing terminals 30 do not necessarily contend with each other. Thus, in the second embodiment, an example of the information processing system in which an instruction from the information processing terminal 30 serving as a slave can be set as a target to be processed will be described.

Figure 13:
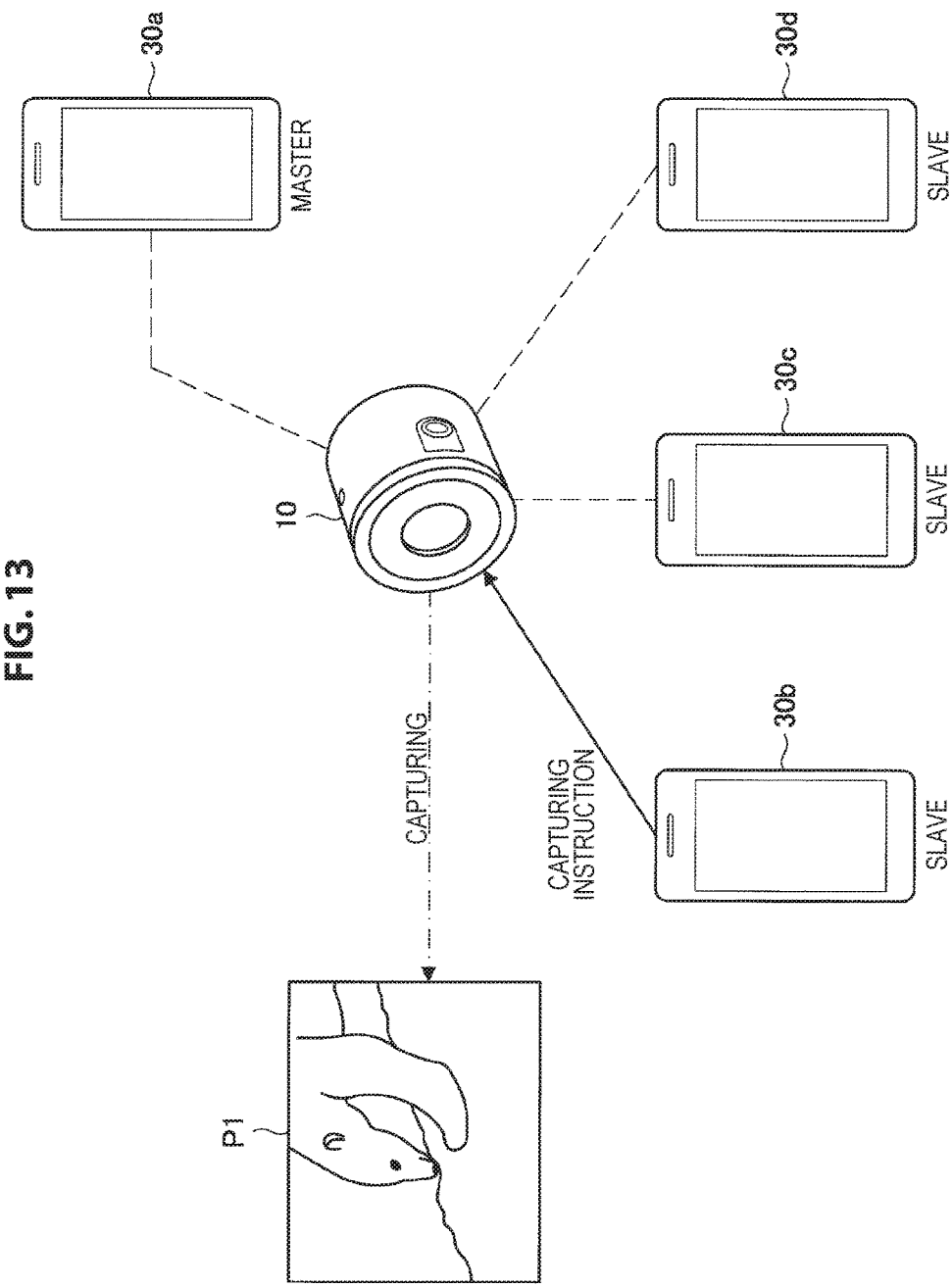
FIG. 13 is a diagram illustrated to describe an overview of an information processing system according to a second embodiment of the present disclosure.

As one example, FIG. 13 is a diagram illustrated to describe an overview of an information processing system according to the second embodiment. In the example illustrated in FIG. 13, from among the information processing terminals 30 connected to the image capturing apparatus 10, the information processing terminal 30a is set as a master and other information processing terminals 30b to 30d are set as a slave.

In the information processing system according to the present embodiment, the image capturing apparatus 10, when receiving the image capturing instruction from the information processing terminal 30a that is set as a master, executes preferentially the instruction from the information processing terminal 30a, which is similar to the first embodiment.

On the other hand, as illustrated in FIG. 13, when the image capturing apparatus 10 receives the instruction from the information processing terminal 30b that is set as a slave, if no instruction from other information processing terminals 30a, 30c, and 30d, the instruction from each of the information processing terminals 30 does not necessarily contend with each other.

Thus, in the information processing system according to the present embodiment, the instruction transmitted from a master is preferentially set as a target to be processed, but the instruction transmitted from a slave can be a target to be processed when the process based on the instruction from other information processing terminals 30 including a master is not executed. This configuration makes it for the information processing system according to the present embodiment possible to set the instruction from a slave as a target to be processed in the range in which the image capturing instructions from a plurality of the information processing terminals 30 do not contend with each other.

Figure 14:
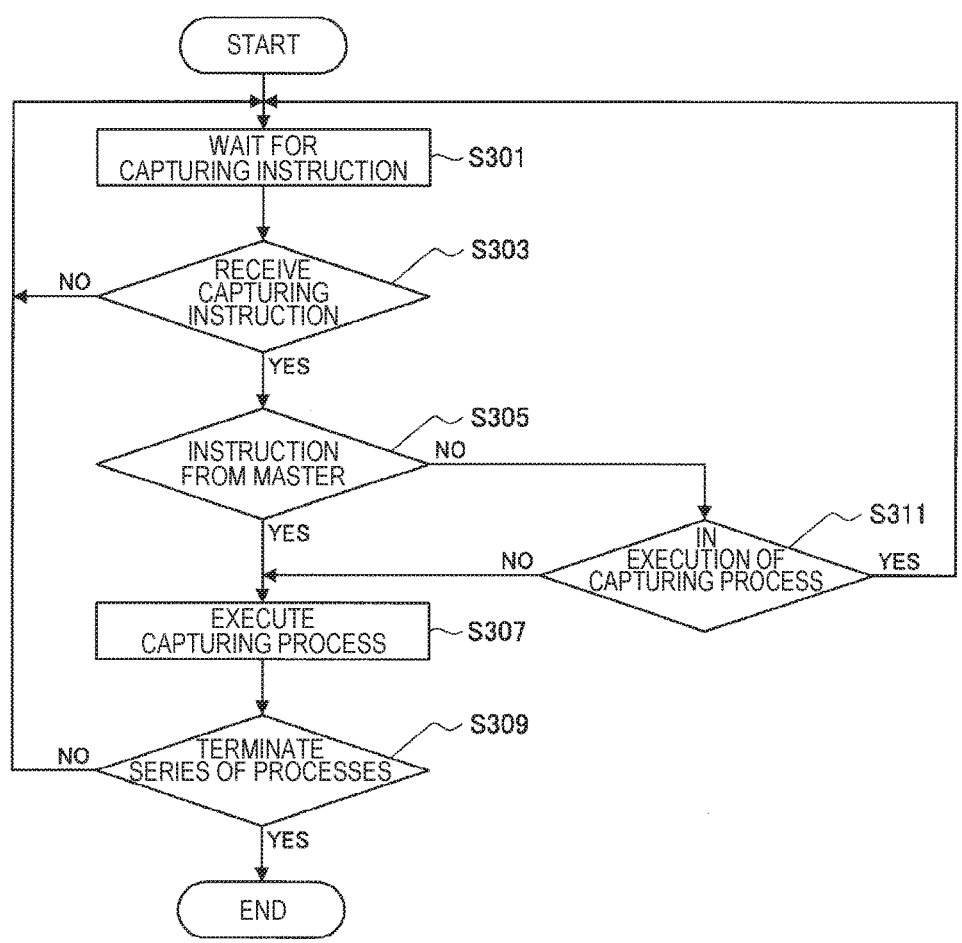
FIG. 14 is a flowchart illustrated to describe an exemplary processing procedure of the information processing system according to the present embodiment.

The operation of the information processing system according to the present embodiment will be described in more detail. The method of setting one of a plurality of the information processing terminals 30 as a master and the method of identifying the master are similar to those of the first embodiment described above. Thus, with reference to FIG. 14, this description will be provided for a series of operations in a case where the image capturing apparatus 10 receives an instruction from each of the information processing terminals 30 and the image capturing process based on the instruction is executed, but a detailed description of other operations will be omitted. FIG. 14 is a flowchart illustrated to describe an exemplary processing procedure of the information processing system according to the present embodiment, and illustrates an example of a series of processing procedures of the image capturing to be executed by the image capturing apparatus 10.

(Steps S301 and S303)

The image capturing apparatus 10, when establishing communication with each of the information processing terminals 30 via the network N1, waits for the image capturing instruction from each of the information processing terminals 30 (NO in step S303). When the communication between the image capturing apparatus 10 and one of the information processing terminals 30 is established via the network N2, the communication sequence described above is previously executed between the relevant information processing terminal 30 and the image capturing apparatus 10. This allows the information processing terminal 30 connected via the network N2 to be set as a master with respect to the image capturing apparatus 10.

(Steps S303 and S305)

If the image capturing instruction is received from the information processing terminal 30, the identification unit 11 of the image capturing apparatus 10 identifies whether the received instruction is the instruction transmitted from a master or a slave, and notifies the process execution unit 113 of a result obtained by the identification. The method of identification is substantially similar to that descried above.

(Steps S305 and S307)

If the received instruction is the instruction from a master (NO in step S305), the process execution unit 113 causes the imaging unit 191 to execute a process corresponding to the instruction.

As a specific example, when the image capturing instruction is received via the network N1, the process execution unit 113 causes the imaging unit 191 to capture an image based on the instruction. In this time, the process execution unit 113 may acquire the captured image from the imaging unit 191 and may output the acquired image to each of the information processing terminals 30 (for example, information processing terminals 30a to 30c) via the network N1. The process execution unit 113 may acquire the captured image directly from the imaging unit 191, or may read the image recorded in the storage unit 193.

The process execution unit 113, when receiving the instruction to output the through-the-lens image via the network N1, causes the imaging unit 191 to capture the through-the-lens image based on the instruction. Then, the process execution unit 113 sequentially acquires the captured through-the-lens images from the imaging unit 191 and outputs the acquired through-the-lens image to each of the information processing terminals 30 via the network N1.

(Steps S305 and S311)

If the received instruction is the instruction from a slave (NO in step S305), the process execution unit 113 determines whether the image capturing process based on the instruction from other slave is in execution. If the process based on the instruction from other slave is in execution (YES in step S311), the process execution unit 113 regards the received instruction as a target that is not intended to be processed. In this case, the image capturing apparatus 10 waits for another image capturing instruction again.

(Steps S311 and S307)

If the process based on the instruction from other slave is not in execution (NO in step S311), the process execution unit 113 causes the imaging unit 191 to execute a process corresponding to the instruction.

(Step S309)

The image capturing apparatus 10 executes the processes described above until the completion of the series of processes is instructed from the user (e.g., until an instruction is made to turn off the power) (NO in step S309). In other words, the image capturing apparatus 10 terminates the series of processes described above, based on a termination instruction from the user (YES in step S309).

When an instruction from a master is received while the process based on the instruction from a slave is in execution, the process execution unit 113 may give priority to the instruction from a master. In this case, as one example, the process execution unit 113 may stop the process based on the instruction from a slave and may execute the process based on the instruction received from a master.

The process execution unit 113 may notify each of the information processing terminals 30 of the state in which the image capturing process is executed via the network N1. As a specific example, when a process based on the instruction from one of the information processing terminals 30a to 30d is in execution, the process execution unit 113 may notify other information processing terminal 30 via the network N1 that the process is in execution.

As described above, in the information processing system according to the present embodiment, one of a plurality of the information processing terminals 30 connected to the image capturing apparatus 10 via the network N1 is set as a master that has higher priority than that of the others. The image capturing apparatus 10 regards the instruction from a master as a target to be processed preferentially, but regards the instruction from a slave as a target to be processed when the process based on the instruction from other information processing terminals 30 including a master is not executed.

Such a configuration described above makes it possible for the information processing system according to the present embodiment to prevent the image capturing instructions from a plurality of the information processing terminals 30 to the image capturing apparatus 10 from contending with each other. In the information processing system according to the present embodiment, the instruction from a slave can be regarded as a target to be processed in the range in which the image capturing instructions from a plurality of the information processing terminals 30 do not contend with each other.

3. THIRD EMBODIMENT

An information processing system according to a third embodiment will be described. In the information processing system according to the first and second embodiments, the image capturing apparatus 10 prevents the instructions from a plurality of the information processing terminals 30 from contending with each other by controlling exclusively the instruction from the information processing terminal 30 that is set as a master. In the present embodiment, an example of mechanism capable of preventing the processes from contending against each other in a case where the image capturing apparatus 10 executes the respective processes based on the instruction from each of the information processing terminals 30 in parallel (i.e., parallel processing) will be described.

Figure 15:
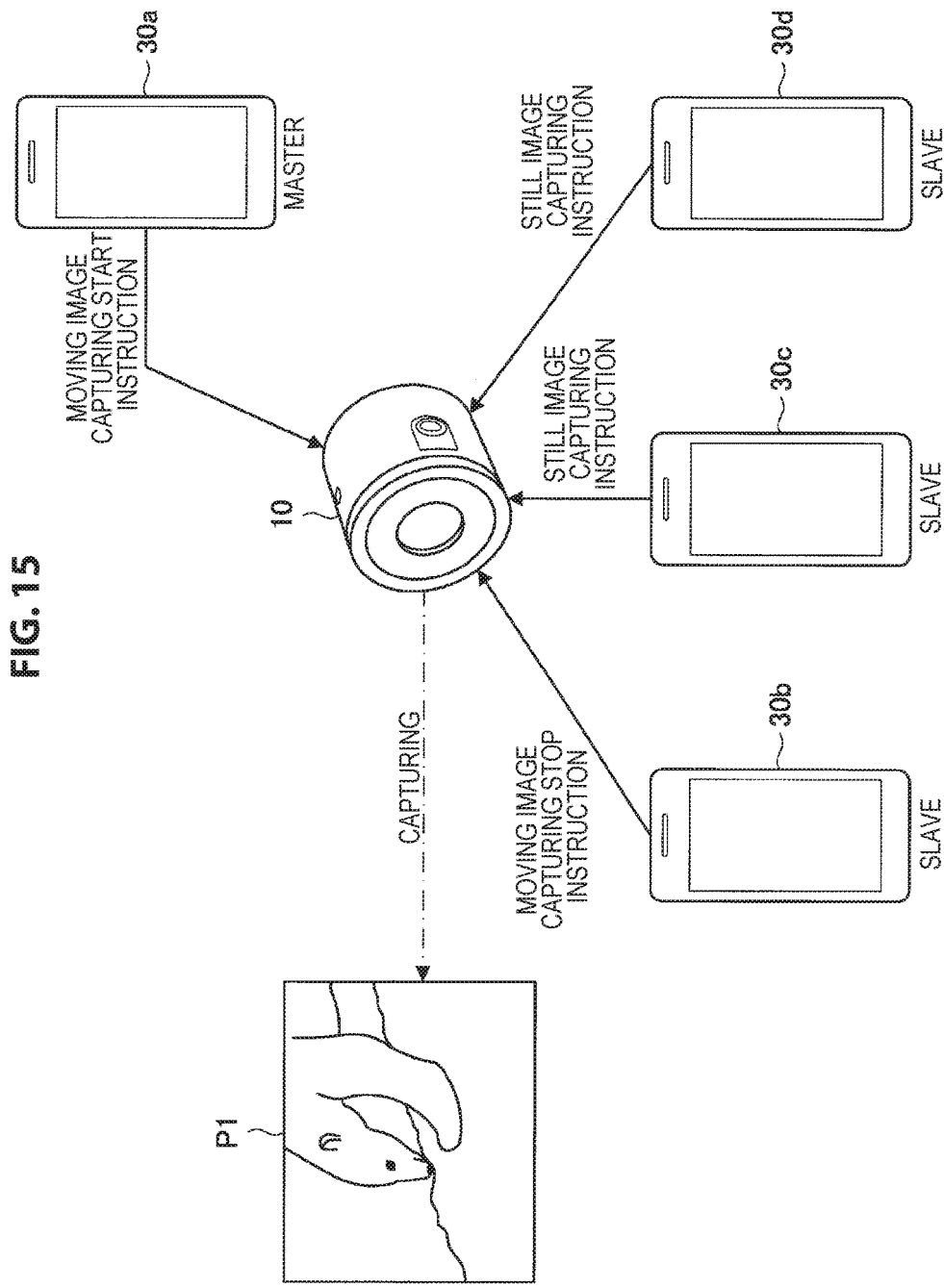
FIG. 15 is a diagram illustrated to describe an overview of an information processing system according to a third embodiment of the present disclosure.

An overview of the information processing system according to the present embodiment will be described with reference to FIG. 15. FIG. 15 is a diagram illustrated to describe an overview of the information processing system according to the present embodiment. In the example illustrated in FIG. 15, from among the information processing terminals 30a to 30d connected to the image capturing apparatus 10, the information processing terminal 30a is set as a master and the other information processing terminals 30b to 30d are set as a slave.

As illustrated in FIG. 15, in the information processing system according to the present embodiment, the image capturing apparatus 10 receives an image capturing instruction from each of the information processing terminals 30a to 30d and executes the image capturing process for each of the instructions.

An example of the image capturing instruction includes an instruction for capturing a moving image and an instruction for capturing a still image. An example of the instruction for capturing a moving image includes a start instruction indicating the start of capturing a moving image and a stop instruction indicating of the end of the started capturing of a moving image. As one example, the image capturing apparatus 10, when receiving the instruction to start capturing a moving image from the information processing terminal 30, starts capturing the moving image. The image capturing apparatus 10, when receiving the instruction to stop capturing the moving image from the information processing terminal 30, stops the started capturing of the moving image, and saves the captured moving image.

In the information processing system according to the present embodiment, the image capturing apparatus 10 processes the start instruction and stop instruction of the moving images received from different information processing terminals 30 in an individual and independent manner for each of the information processing terminals 30 that is a source. As a specific example, in the image capturing apparatus 10, the process for capturing a moving image that is started based on the start instruction from the information processing terminal 30a is not stopped by receiving the stop instruction from the information processing terminal 30b, but is stopped by receiving the stop instruction from the information processing terminal 30a.

As described above, in the information processing system according to the present embodiment, there is provided a mechanism in which the contention among the instruction to start capturing a moving image, the instruction to stop capturing a moving image, and the instruction to capture a still image from each of the information processing terminals 30 can be prevented and the processes based on the respective instructions can be executed in parallel, as illustrated in FIG. 15.

Figure 16:
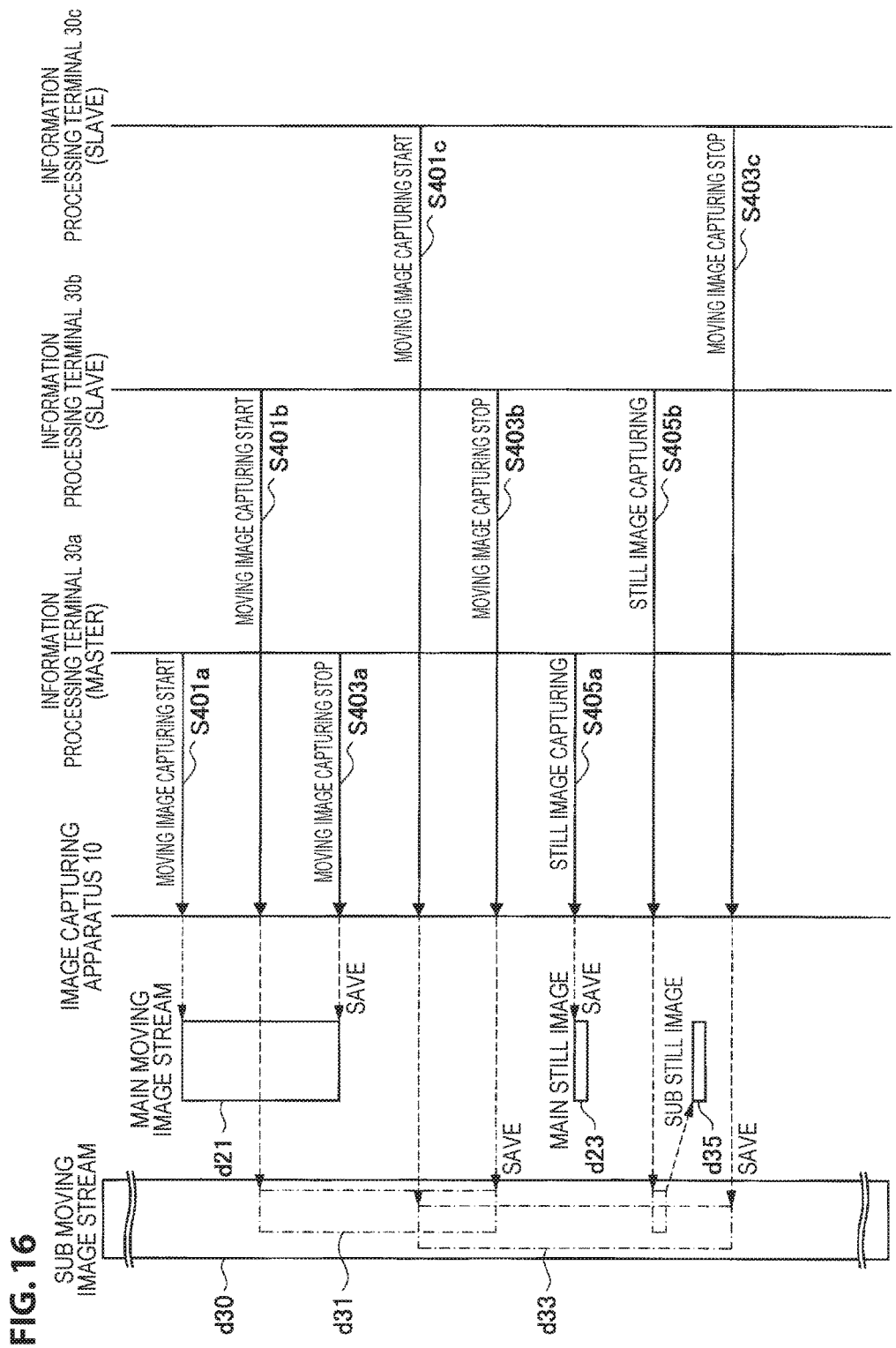
FIG. 16 is a schematic sequence diagram illustrated to describe an exemplary processing procedure of the information processing system according to the present embodiment.

The information processing system according to the present embodiment will be described in detail with reference to FIG. 16. FIG. 16 is a schematic sequence diagram illustrated to describe an exemplary processing procedure of the information processing system according to the present embodiment, and illustrates a series of processing procedures for image capturing executed by the image capturing apparatus 10. The method of setting one of a plurality of the information processing terminals 30 as a master and the method of identifying the master are similar to those of the first embodiment described above. Thus, this description will be provided for a series of operations in a case where the image capturing apparatus 10 receives an instruction from each of the information processing terminals 30 and the image capturing process is executed based on the instruction, but a detailed description of other operations will be omitted.

The example illustrated in FIG. 16 shows a case where the image capturing apparatus 10 receives an image capturing instruction from the information processing terminal 30a that is set as a master and from each of the information processing terminals 30b and 30c that are set as a slave. Referring to FIG. 16, the following description will be provided, for each of the instruction to start capturing a moving image, the instruction to stop capturing a operation image, and the instruction to capture a still image by the image capturing apparatus 10, of a case where the source for transmission of the instructions is a master and a case where the source for transmission of the instructions is a slave.

The process execution unit 113 of the image capturing apparatus 10, when receiving an instruction to start capturing a moving image from the information processing terminal 30a that is a master as shown in step S401a, causes the imaging unit 191 to start capturing the moving image based on the instruction. The process execution unit 113 stops the moving image capturing process, which is started by the imaging unit 191 based on the start instruction, by receiving an instruction to stop capturing the moving image from the information processing terminal 30a, as shown in step S403a. In this case, the imaging unit 191 may save the captured moving image d21 by storing it in the storage unit 193.

A data stream of the moving image captured by the imaging unit 191 based on the start instruction and stop instruction from the information processing terminal 30a serving as a master is sometimes referred to as "main moving image stream" hereinafter. In the example illustrated in FIG. 16, the moving image d21 captured in time series corresponds to an example of the main moving image stream.

The process execution unit 113, when receiving an instruction to capture a still image from the information processing terminal 30a that is a master as shown in step S405a, causes the imaging unit 191 to capture a still image d23 based on the instruction. In this case, the imaging unit 191 may save the captured still image d23 by storing it in the storage unit 193.

The still image captured by the imaging unit 191 based on the still image capturing instruction from the information processing terminal 30a serving as a master is sometimes referred to as "main still image" hereinafter. In the example illustrated in FIG. 16, the still image d23 captured in time series corresponds to an example of the main still image.

The process execution unit 113 according to the present embodiment causes the imaging unit 191 to capture sequentially in time series another moving image different from the main moving image stream by regarding it as a sub moving image stream d30. More specifically, the imaging unit 191 outputs an image signal outputted from at least some pixels (so-called pixel-thinned image) of all the pixels in the image sensor by regarding it as a sub moving image stream d30 in capturing the moving image.

The imaging unit 191, when capturing the main moving image stream or the main still image, outputs the main moving image stream or the main still image in parallel with the sub moving image stream d30. More specifically, the imaging unit 191 outputs an image signal outputted from all the pixels in the image sensor as the main moving image stream or the main still image, and outputs a signal obtained by branching image signals for some pixels as the sub moving image stream d30.

The process execution unit 113, when receiving an instruction to start capturing a moving image and an instruction to stop capturing the moving image from the information processing terminal 30a serving as a slave, extracts the moving image based on the instruction from the sub moving image stream 30 captured by the imaging unit 191. More specifically, the process execution unit 113 extracts, as a moving image, a series of frame images, which correspond to a period from the start instruction to the stop instruction for moving image capturing, from the sub moving image stream d30 captured sequentially by the imaging unit 191.

As one example, the process execution unit 113, as shown in step S401b, when receiving the instruction to start capturing the moving image from the information processing terminal 30b serving as a slave, start extracting a frame image from the sub moving image stream d30 based on the instruction. Then, the process execution unit 113, when receiving the instruction to stop capturing the moving image from the information processing terminal 30b as shown in step S403b, acquires a series of frame images extracted by the timing at which the instruction is received as a moving image d31. In this case, the process execution unit 113 may save the acquired moving image d31 by storing it in the storage unit 193.

In addition, the process execution unit 113, as shown in step S401c, when receiving the instruction to start capturing the moving image from the information processing terminal 30c serving as a slave, start extracting a frame image from the sub moving image stream d30 based on the instruction. Then, the process execution unit 113, when receiving the instruction to stop capturing the moving image from the information processing terminal 30b as shown in step S403c, acquires a series of frame images extracted by the timing at which the instruction is received as a moving image d33. In this case, the process execution unit 113 may save the acquired moving image d33 by storing it in the storage unit 193.

It is possible for the process execution unit 113 to execute the moving image capturing instructions from a plurality of the information processing terminals 30b and 30c that are set as a slave in parallel as illustrated in FIG. 16. As a specific example, in the example illustrated in FIG. 16, the process execution unit 113 extracts both the moving images d31 and d33 by the timing from the reception of the instruction indicated in step S401c to the reception of the instruction indicated in step S403b. During this period, the process execution unit 113 may use the frame image extracted from the sub moving image stream d30 to generate both the moving images d31 and d33.

The process execution unit 113, when receiving the instruction to capture a still image from the information processing terminal 30c serving as a slave as shown in step S405b, extracts a frame image corresponding to the timing at which the instruction is received from the sub moving image stream d30. Then, the process execution unit 113 regards the extracted frame image as a still image d35 captured based on the still image capturing instruction. In this case, the process execution unit 113 may save the captured still image d35 by storing it in the storage unit 193.

A trigger in which the image capturing apparatus 10 start or stop the capturing of the sub moving image stream d30 is not limited to a particular one. As a specific example, the image capturing apparatus 10 may start or stop the capturing of the sub moving image stream d30 depending on the instruction from the information processing terminal 30a serving as a master. As another example, the image capturing apparatus 10 may start the capturing of the sub moving image stream d30 at the start of the operation in the mode for capturing an image, and the image capturing apparatus 10 may stop the capturing of the sub moving image stream d30 at the end of the mode.

Although an example in which the process execution unit 113 executes the process for extracting an image from the sub moving image stream d30 has been described in the above, the imaging unit 191 may execute the process for extracting the image from the sub moving image stream d30 instead of the process execution unit 113. In this case, the imaging unit 191 may capture sequentially the sub moving image streams d30 and may output the corresponding frame image to the process execution unit 113 based on the instruction from the process execution unit 113.

The imaging unit 191 may be provided with a storage area for storing data, and thus the imaging unit 191 can hold the image extracted from the sub moving image stream d30 in the storage area. In this case, the process execution unit 113 may read out the image, which is extracted from the sub moving image stream d30, from the storage area.

As described above, in the information processing system according to the present embodiment, the image capturing apparatus 10 acquires sequentially moving images as the sub moving image stream d30 in addition to the image capturing process based on the image capturing instruction from a master. Then, the image capturing apparatus 10, when receiving an image capturing instruction (i.e., moving or still image) from a slave, extracts some frame images of the sub moving image stream d30 as moving or still images in response to the instruction.

With the configuration described above, in the information processing system according to the present embodiment, the image capturing apparatus 10 executes each process based on the image capturing instruction from each of the information processing terminals 30 in parallel. This makes it possible for the information processing system according to the present embodiment to prevent the instructions for capturing images from a plurality of the information processing terminals 30 from contending with each other.

4. FOURTH EMBODIMENT

Figure 17:
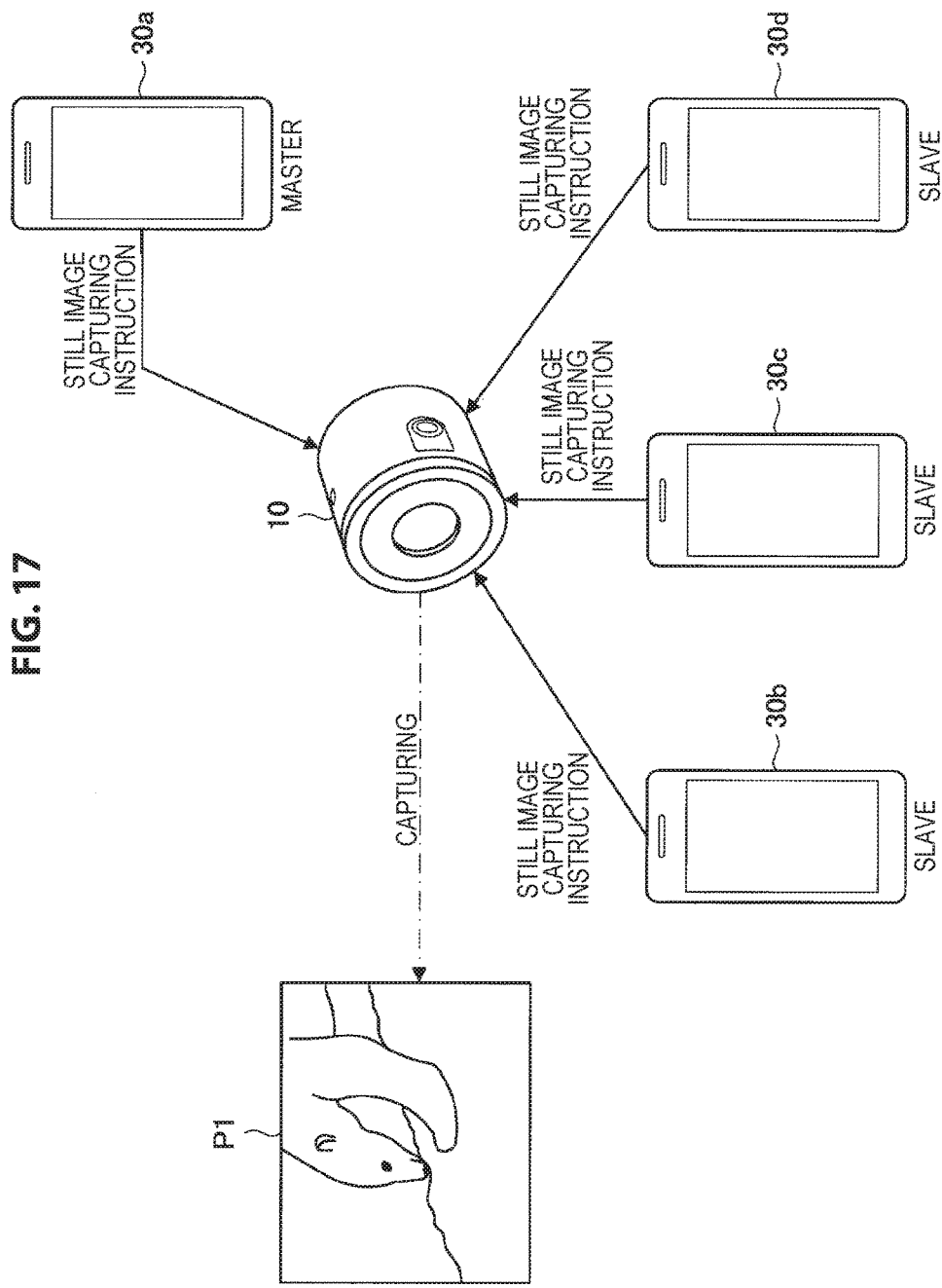
FIG. 17 is a diagram illustrated to describe an overview of an information processing system according to a fourth embodiment of the present disclosure.

An information processing system according to a fourth embodiment will be described. An overview of the information processing system according to the present embodiment will be described with reference to FIG. 17. FIG. 17 is a diagram illustrated to describe an overview of the information processing system according to the present embodiment. In the example illustrated in FIG. 17, from among the information processing terminals 30a to 30d connected to the image capturing apparatus 10, the information processing terminal 30a is set as a master and the other information processing terminals 30b to 30d are set as a slave.

When each of the information processing terminals 30 transmits an instruction to capture a still image to the image capturing apparatus 10 as illustrated in FIG. 17, the same capturing condition is not necessarily set for these capturing instructions. Then, some of these capturing conditions may be difficult to be shared among a plurality of capturing instructions. As a specific example, the setting of an optical system such as optical zoom and ISO sensitivity is difficult to satisfy a plurality of capturing conditions.

Thus, as one example, when a capturing condition based on an instruction transmitted previously from the information processing terminal 30b is changed, it is assumed that the capturing condition is incorporated into an image capturing process based on an instruction transmitted subsequently from the information processing terminal 30c. In such a case, sometimes, capturing conditions instructed from each of the information processing terminals 30 b and 30c may contend with each other, and thus the image captured based on the instruction from the information processing terminal 30c is not an image that is intended by the user of the information processing terminal 30c.

Thus, the information processing system according to the present embodiment provides a mechanism capable of preventing the contention between image capturing conditions instructed from each of the information processing terminals 30, as described above.

Figure 18:
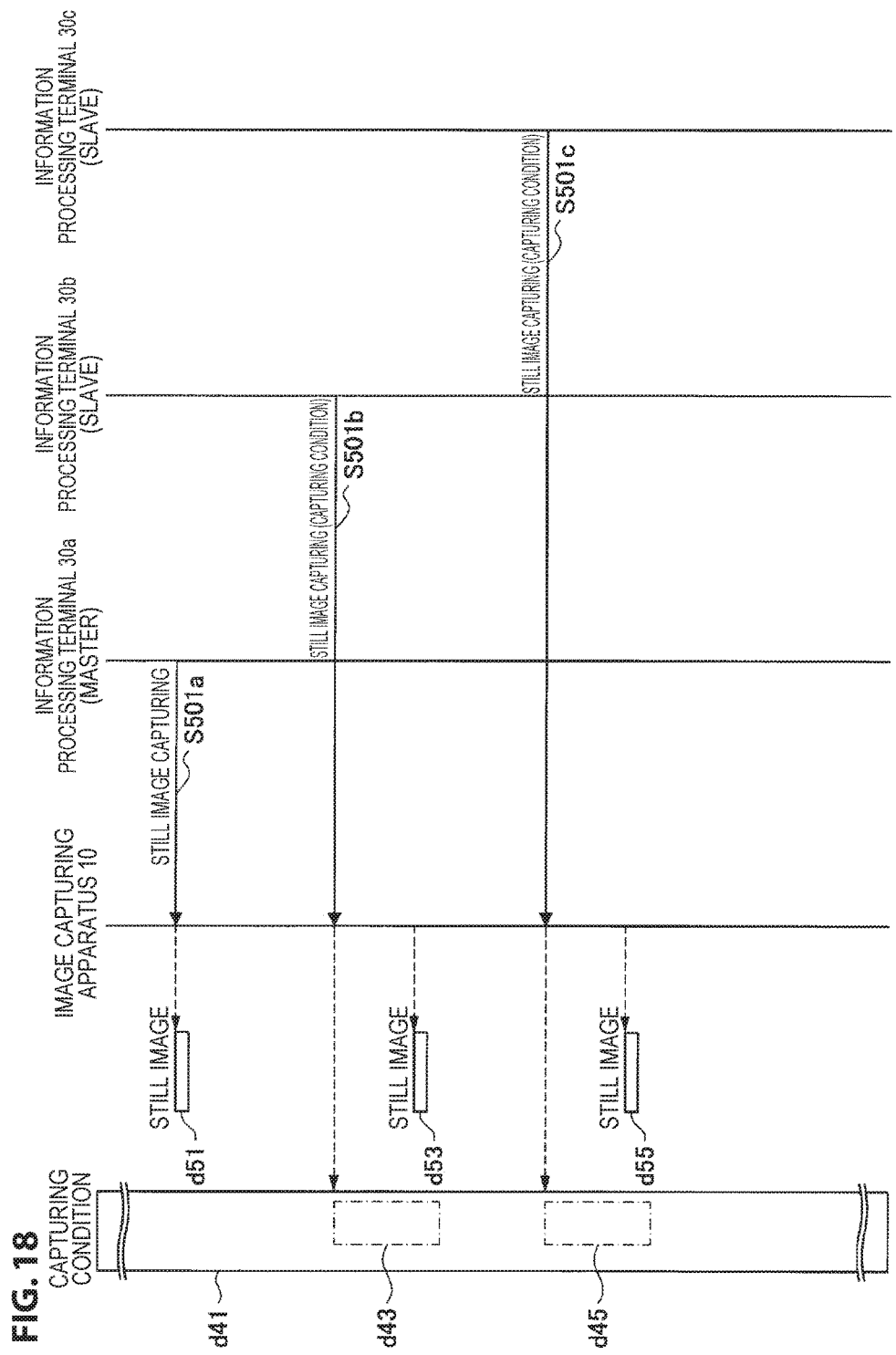
FIG. 18 is a schematic sequence diagram illustrated to describe an exemplary processing procedure of the information processing system according to the present embodiment.

The operation of the information processing system according to the present embodiment will be described in more detail with reference to FIG. 18. FIG. 18 is a schematic sequence diagram illustrated to describe an exemplary processing procedure of the information processing system according to the present embodiment, and illustrates an example of a series of processing procedures of still image capturing performed by the image capturing apparatus 10. The method of setting one of a plurality of the information processing terminals 30 as a master and the method of identifying the master are similar to those of the first embodiment described above. Thus, this description will be provided for a series of operations in a case where the image capturing apparatus 10 receives an instruction from each of the information processing terminals 30 and executes a process for capturing images based on the instruction, but a detailed description of other operations will be omitted.

The example illustrated in FIG. 18 shows a case where the image capturing apparatus 10 receives an instruction to capture a still image from the information processing terminal 30a that is set as a master and each of the information processing terminals 30b and 30c that are set as a slave. Referring to FIG. 18, the following description will be provided, for the operation by the image capturing apparatus 10 based on the instruction to capture a still image in response to the capturing condition specified by the still image capturing instruction, of a case where the source for transmission of the instruction is a master and a case where the source for transmission of the instruction is a slave.

As shown in reference numeral d41 of FIG. 18, the image capturing apparatus 10 regards a capturing condition, which is instructed previously from the information processing terminal 30a serving as a master, as a main capturing condition, and holds the setting based on the main capturing condition.

Then, the process execution unit 113 of the image capturing apparatus 10 according to the present embodiment, when receiving the instruction to capture a still image from the information processing terminal 30a that is a master as shown in step S501a, causes the imaging unit 191 to capture a still image d51 based on a main capturing condition d41.

On the other hand, the process execution unit 113, when receiving the instruction to capture a still image from the information processing terminal 30 serving as a slave together with a capturing condition, instructs the imaging unit 191 to temporarily change the main capturing condition d41 to the received capturing condition for capturing the image based on the capturing condition.

As one example, as shown in step S501b, the process execution unit 113, when receiving an instruction to capture a still image from the information processing terminal 30b serving as a slave together with a capturing condition, instructs the imaging unit 191 to change the capturing condition to the received capturing condition as indicated by reference numeral d43. Then, the process execution unit 113 causes the imaging unit 191 to capture a still image d53 based on the changed capturing condition. When the capturing of the still image d53 is completed, the process execution unit 113 causes the imaging unit 191 to change the changed capturing condition d43 to the main capturing condition d41 back again.

In a similar way, as shown in step S501c, the process execution unit 113, when receiving an instruction to capture a still image from the information processing terminal 30c serving as a slave together with a capturing condition, instructs the imaging unit 191 to change the capturing condition to the received capturing condition as indicated by reference numeral d45. Then, the process execution unit 113 causes the imaging unit 191 to capture a still image d55 based on the changed capturing condition. When the capturing of the still image d55 is completed, the process execution unit 113 causes the imaging unit 191 to change the changed capturing condition d45 to the main capturing condition d41 back again.

As described above, the image capturing apparatus 10 according to the present embodiment regards the capturing condition instructed previously from the information processing terminal 30a that is a master as a main capturing condition and hold the setting based on the main capturing condition. Then, the image capturing apparatus 10, when receiving an instruction to capture a still image from another information processing terminal 30 together with the capturing condition, changes temporarily the main capturing condition to the received capturing condition, and captures an image based on the capturing condition. When the capturing of an image is completed, the image capturing apparatus 10 changes the changed capturing condition to the main capturing condition back again.

With the configuration described above, in accordance with the information processing system according to the present embodiment, even under a condition in which an instruction of a capturing condition is provided from each of the information processing terminals 30 to the image capturing apparatus 10, it is possible to prevent the capturing conditions instructed from each of the information processing terminals 30 from contending with each other.

5. FIFTH EMBODIMENT

Figure 19:
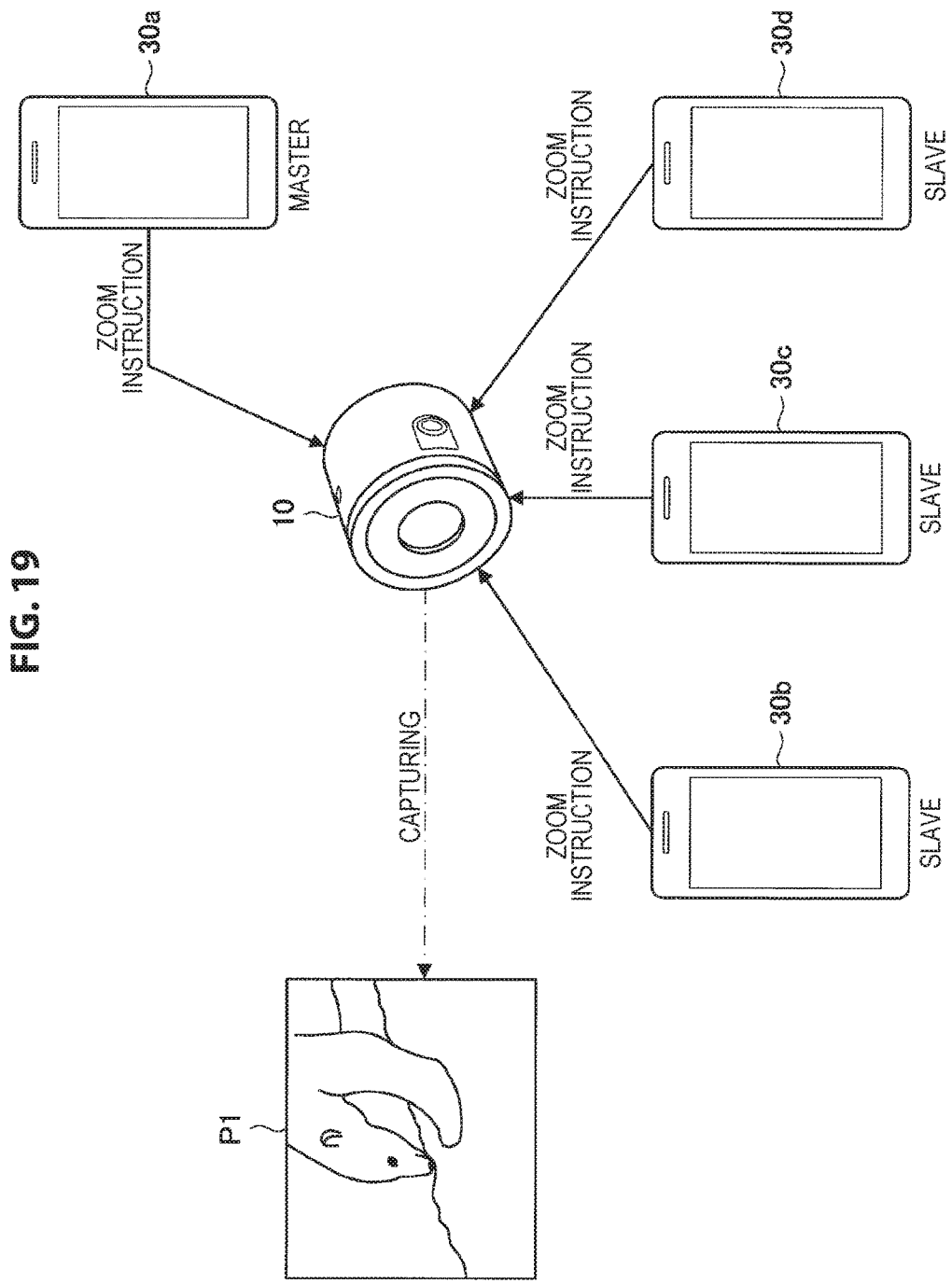
FIG. 19 is a diagram illustrated to describe an overview of an information processing system according to a fifth embodiment of the present disclosure.

An information processing system according to a fifth embodiment will be described. An overview of the information processing system according to the present embodiment will be described with reference to FIG. 19. FIG. 19 is a diagram illustrated to describe an overview of the information processing system according to the present embodiment. In the example illustrated in FIG. 19, from among the information processing terminals 30a to 30d connected to the image capturing apparatus 10, the information processing terminal 30a is set as a master and the other information processing terminals 30b to 30d are set as a slave.

As illustrated in FIG. 19, even under a condition in which an instruction to change the magnification ratio (zoom) is transmitted from each of the information processing terminals 30 to the image capturing apparatus 10, it is difficult for the image capturing apparatus 10 to cause a plurality of settings to coexist when the magnification ratio based on the optical zoom is adjusted for each instruction.

As a specific example, it is assumed that the image capturing apparatus 10 adjusts the magnification ratio based on the optical zoom for the instruction received previously from the information processing terminal 30b and then re-adjusts the magnification ratio based on the optical zoom for an instruction received from the information processing terminal 30c. In this case, sometimes, the settings of the magnification ratio (zoom) instructed by each of the information processing terminals 30b and 30c contend with each other and the magnification ratio that is changed based on the instruction from the information processing terminal 30c is not necessarily a magnification ratio intended by the user of the information processing terminal 30b.

Thus, the information processing system according to the present embodiment provides the mechanism for preventing the settings of the magnification ratio instructed from each of the information processing terminals 30 from contending with each other as described above.

Figure 20:
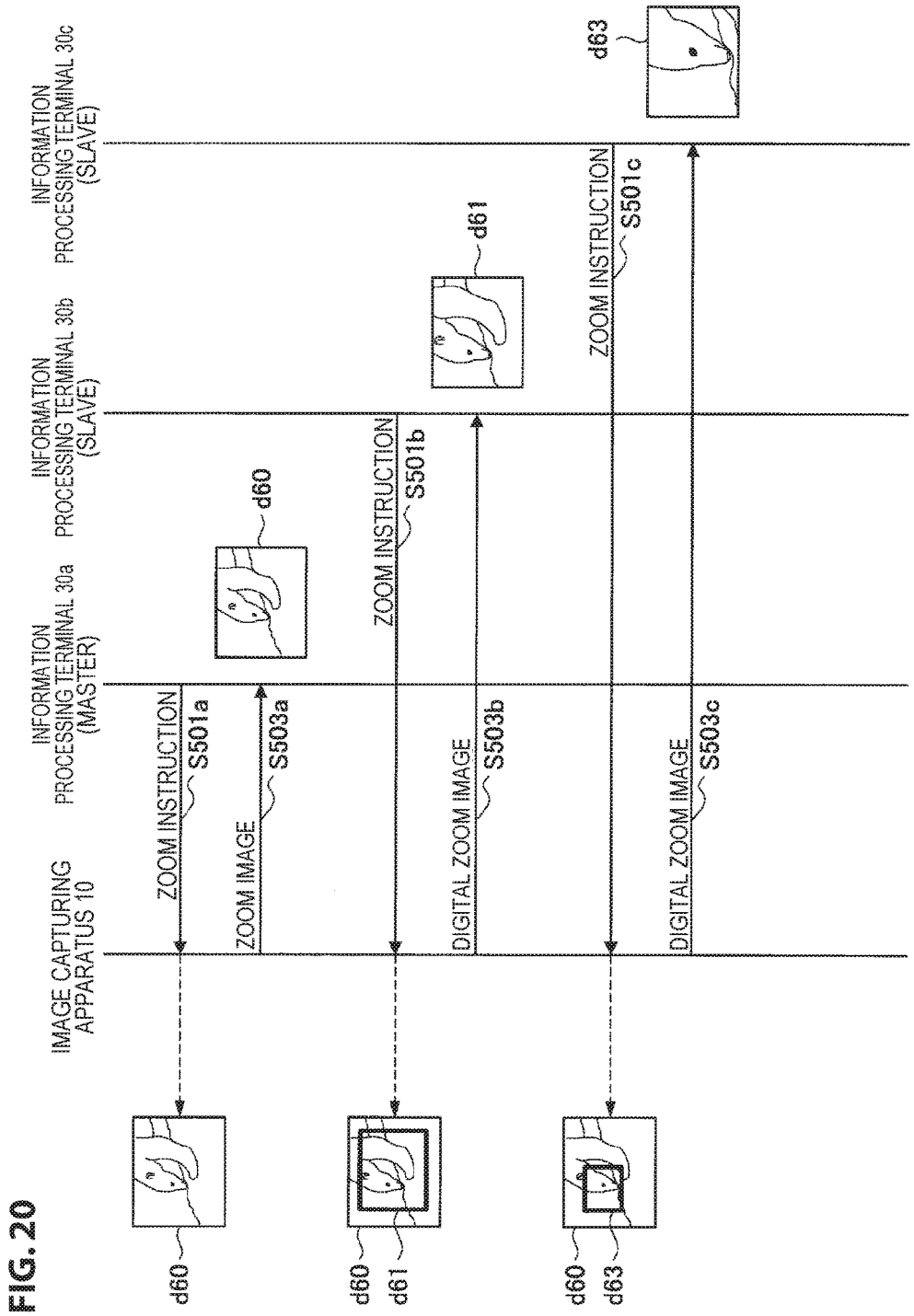
FIG. 20 is a schematic sequence diagram illustrated to describe an exemplary processing procedure of the information processing system according to the present embodiment.

The operation of the information processing system according to the present embodiment will be described in more detail with reference to FIG. 20. FIG. 20 is a schematic sequence diagram illustrated to describe an exemplary processing procedure of the information processing system according to the present embodiment, and illustrates an example of a series of processing procedures of the incorporation of the magnification ratio setting by the image capturing apparatus 10. The method of setting one of a plurality of the information processing terminals 30 as a master and the method of identifying the master are similar to those of the first embodiment described above. Thus, this description will be provided for a series of operations in a case where the image capturing apparatus 10 receives an instruction from each of the information processing terminals 30 and executes a process for changing the magnification ratio (zoom) based on the instruction, but a detailed description of other operations will be omitted.

The example illustrated in FIG. 20 shows a case where the image capturing apparatus 10 receives an instruction to change the magnification ratio (zoom) from the information processing terminal 30a that is set as a master and each of the information processing terminals 30b and 30c that are set as a slave. With reference to FIG. 20, the following description will be provided, for the operation based on the instruction to change the magnification ratio (zoom) by the image capturing apparatus 10, of a case where the source for transmission of the instruction is a master and a case where the source for transmission of the instruction is a slave.

As shown in step S501a of FIG. 18, the process execution unit 113 of the image capturing apparatus 10 according to the present embodiment, when receiving an instruction to change the magnification ratio from the information processing terminal 30a serving as a master, instructs the imaging unit 191 to adjust the magnification ratio based on the optical zoom.

Then, as shown in step S503a, the process execution unit 113 causes the imaging unit 191 to capture the image in which the magnification ratio based on the optical zoom is adjusted (i.e., zoom image) and presents the zoom image d60 to the information processing terminal 30a that is the source for transmission of the instruction.

On the other hand, the process execution unit 113, when receiving an instruction to change the magnification ratio from the information processing terminal 30 serving as a slave, presents a digital zoom image based on the magnification ratio to the information processing terminal 30 that is the source for transmission of the instruction without a change in the settings of optical zoom.

In one example, as shown in step S501b, the process execution unit 113, when receiving an instruction to change the magnification ratio from the information processing terminal 30b serving as a slave, causes the imaging unit 191 to capture an image without a change in the settings of optical zoom. Then, the process execution unit 113 extracts an image based on the magnification ratio instructed from the information processing terminal 30b of the images captured by the imaging unit 191, that is, a partially magnified image specified from the information processing terminal 30b of the captured images, based on a digital zooming process.

Then, the process execution unit 113 presents the digital zoom image d61 extracted based on the digital zooming process to the information processing terminal 30b that is the source for transmission of the instruction, as shown in step S503b.

In a similar way, as shown in step S501c, the process execution unit 113, when receiving an instruction to change the magnification ratio from the information processing terminal 30c serving as a slave, causes the imaging unit 191 to capture an image without a change in the settings of optical zoom. Then, the process execution unit 113 extracts an image based on the magnification ratio instructed from the information processing terminal 30c of the images captured by the imaging unit 191, that is, a partially magnified image specified from the information processing terminal 30c of the captured images, based on a digital zooming process.

Then, the process execution unit 113 presents the digital zoom image d63 extracted based on the digital zooming process to the information processing terminal 30c that is the source for transmission of the instruction, as shown in step S503c.

The process execution unit 113, when presenting (transmitting) an image to each of the information processing terminals 30, may execute a compression process on the image. In this case, the process execution unit 113, when presenting the digital zoom image based on the instruction to change the magnification ratio from the information processing terminal 30 serving as a slave, may change the compression ratio of the compression process on the digital zoom image depending on the magnification ratio.

As a specific example, the resolution (in other words, image quality) of the digital zoom image tends to decrease as the magnification ratio increases. Thus, the process execution unit 113 may set the compression ratio of the compression process on the digital zoom image to be decreased, as the magnification ratio increases. This configuration makes it possible for the process execution unit 113 to present the digital zoom image having fixed resolution (image quality) regardless of the difference in magnification ratios to each of the information processing terminals 30 even when the digital zoom image is outputted to the information processing terminal 30 serving as a slave.

In this way, the image capturing apparatus 10 according to the present embodiment adjusts the magnification ratio based on the optical zoom when an instruction to change the magnification ratio is provided from the information processing terminal 30a serving as a master. On the other hand, the image capturing apparatus 10 adjusts the magnification ratio based on the digital zooming when an instruction to change the magnification ratio is provided from other information processing terminal 30 serving as a slave.

With the configuration described above, in accordance with the information processing system according to the present embodiment, even under a condition in which an instruction to change the magnification ratio is provided from each of the information processing terminals 30 to the image capturing apparatus 10, it is possible to prevent the settings of the magnification ratio instructed from each of the information processing terminals 30 from contending with each other.

6. HARDWARE CONFIGURATION

Figure 21:
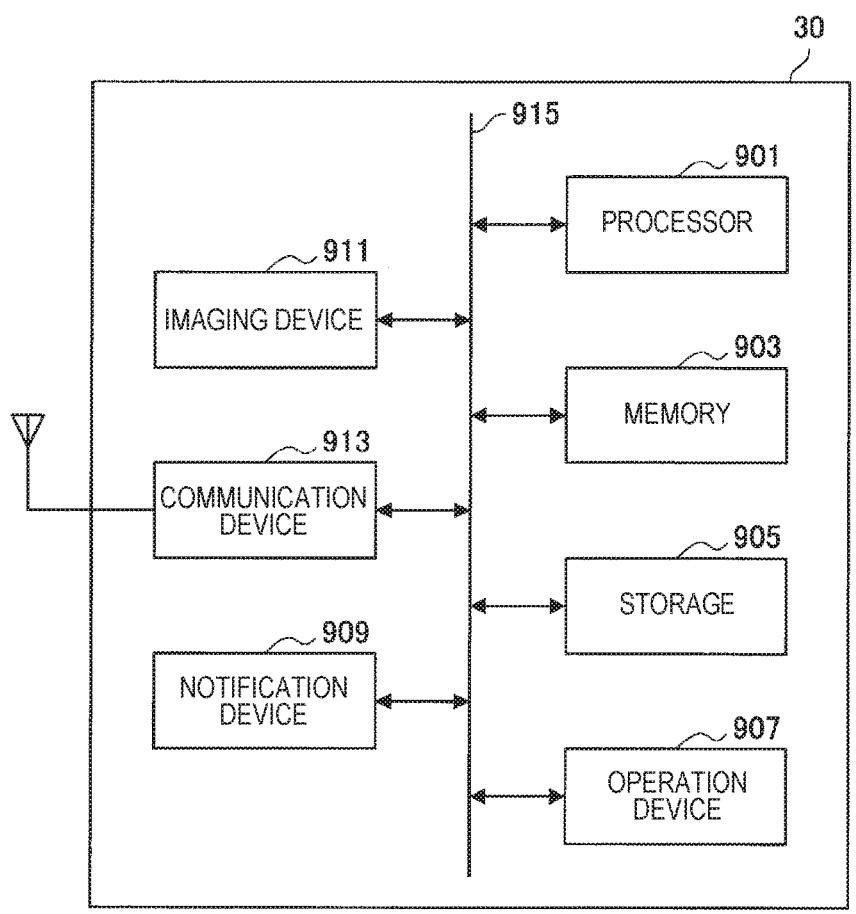
FIG. 21 is a diagram illustrating an exemplary hardware configuration of the image capturing apparatus according to each of the embodiments of the present disclosure.

An exemplary hardware configuration of the image capturing apparatus 10 according to each of the present embodiments of the present disclosure will be described with reference to FIG. 21. FIG. 21 is a diagram illustrating an exemplary hardware configuration of the image capturing apparatus 10 according to each of the embodiments of the present disclosure.

As illustrated in FIG. 21, the image capturing apparatus 10 according to the present embodiment is configured to include a processor 901, a memory 903, a storage 905, an imaging device 911, a communication device 913, and a bus 915. The image capturing apparatus 10 may be configured to include an operation device 907 and a notification device 909.

The processor 301 may be a central processing unit (CPU), a graphics processing unit (GPU), a digital signal processor (DSP), or a system on chip (SoC), as one example, and executes various types of processes for the image capturing apparatus 10. The processor 901 can be composed of an electronic circuit for executing various types of arithmetic and logical processes, as one example. The controller 110 described above may be implemented by the processor 901.

An example of the memory 903 includes random-access memory (RAM) and read-only memory (ROM), and the memory 903 stores data and a program executed by the processor 901. The storage 905 may include a storage medium such as a semiconductor memory or a hard disk. As one example, the storage unit 193 described above may be at least one of the memory 903 and the storage 905 or may be configured by a combination of the both.

The operation device 907 has a function of generating an input signal used to perform an operation intended by the user. The operation device 907 may be configured to include an input unit, such as a button or switch, used to allow the user to enter information and an input control circuit used to generate an input signal based on the user's input and supply it to the processor 901, as one example.

The notification device 909 is an example of an output device, and may be a device such as a liquid crystal display (LCD) device and organic light emitting diode (OLED) device, as one example. In this case, the notification device 909 can notify the user of predetermined information by displaying a screen.

As another example, the notification device 909 may be a device for notifying the user of predetermined information using a pattern of lighting or blinking, such as a light emitting diode (LED). The notification device 909 may be a device, such as a speaker, for notifying the user of predetermined information by outputting an acoustic signal.

The imaging device 911 has a function of shooting a still image or a moving image through a lens under the control by the processor 901. The imaging device 911 may store the captured image in the memory 903 or the storage 905. The imaging unit 191 described above may be implemented by the imaging device 911.

The communication device 913 is communication means provided in the image capturing apparatus 10 and communicates with an external device via a network. The communication device 913 is a wired or wireless communication interface. When the communication device 913 is used as a wireless communication interface, the communication device 913 may be configured to include a communication antenna, a radio frequency (RF) circuit, a baseband processor, or the like.

The communication device 913 has a function of performing various types of signal processes on the signal received from an external device, and can supply a digital signal generated from an analog signal to the processor 901. The first communication unit 101 and the second communication unit 103 may be configured as the communication device 913.

The bus 915 connects the processor 901, the memory 903, the storage 905, the operation device 907, the notification device 909, the imaging device 911, and the communication device 913 to each other. The bus 915 may be configured to include a plurality types of buses.

A program that allows hardware including a processor, a memory, and a storage incorporated in a computer to provide a function equivalent to the configuration of the image capturing apparatus 10 described above can be created. A computer readable recording medium in which the program is recorded can be also provided.

7. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing apparatus including:

a receiver configured to receive an instruction to capture an image from at least one of a plurality of external devices via a wireless communication channel, each of the external devices having priority set previously; and a controller configured to control an operation of an imaging unit based on the instruction depending on the priority set in the external device serving as a source for transmission of the instruction, the imaging unit being configured to capture the image.

(2)

The information processing apparatus according to (1), wherein the plurality of external devices include any one external device having priority higher than priority of another external device, and the controller controls the operation of the imaging unit based on the instruction depending on whether the source for transmission of the instruction is the one external device or the other external device.

(3)
The information processing apparatus according to (2),
wherein the controller controls the operation of the imaging unit by giving preference to the instruction from the one external device over the instruction from the other external device.

(4)
The information processing apparatus according to (3),
wherein the controller, when controlling the operation of the imaging unit based on the instruction from the one external device, prevents the operation of the imaging unit based on the instruction from the other external device from being controlled.

(5)
The information processing apparatus according to (2),
wherein the controller controls the operation of the imaging unit based on only the instruction from the one external device.

(6)
The information processing apparatus according to (2),
wherein the controller changes content to be controlled of the imaging unit depending on whether the source for transmission of the instruction is the one external device or the other external device.

(7)
The information processing apparatus according to (6),
wherein the controller causes the imaging unit to sequentially capture a moving image, and when the source for transmission of the instruction is the other external device, extracts some frame images from the sequentially captured moving images as the image captured based on the instruction.

(8)
The information processing apparatus according to (6),
wherein the controller, when the source for transmission of the instruction is the other external device, causes the imaging unit to change a first capturing condition set previously based on the instruction from the one external device to a second capturing condition instructed from the other external device and to capture the image, and after capturing the image, causes the imaging unit to change the second capturing condition to the first capturing condition back again.

(9)
The information processing apparatus according to (6),
wherein the controller, when the source for transmission of the instruction is the other external device, acquires a digital zoom image corresponding to at least a portion of an image captured by the imaging unit based on a magnification ratio instructed from the other external device.

(10)
The information processing apparatus according to any one of (2) to (9), including:
an identification unit configured to identify the one external device and the other external device from among the plurality of external devices.

(11)
The information processing apparatus according to (10),
wherein the identification unit identifies an external device previously executing a predetermined communication sequence as the one external device among the plurality of external devices.

(12)
The information processing apparatus according to (10),
wherein the identification unit identifies an external device located at a nearer position as the one external device among the plurality of external devices.

(13)
The information processing apparatus according to (10),
wherein the identification unit identifies an external device that is in close contact with the information processing apparatus as the one external device among the plurality of external devices.

(14)
The information processing apparatus according to (10),
wherein the identification unit identifies an external device connected via another communication channel different from the communication channel as the one external device among the plurality of external devices.

(15)
An information processing apparatus including:
a controller configured to associate an instruction to capture an image with priority previously set in the information processing apparatus with respect to another apparatus; and
a transmitter configured to transmit the instruction associated with the priority to an external device via a wireless communication channel, the external device controlling an operation for capturing the image.

(16)
An information processing method including:
receiving an instruction to capture an image from at least one of a plurality of external devices via a wireless communication channel, each of the external devices having priority set previously; and
controlling, by a processor, an operation of an imaging unit based on the instruction depending on the priority of the external device serving as a source for transmission of the instruction, the imaging unit being configured to capture the image.

(17)
An information processing method including:
associating, by a processor, an instruction to capture an image with priority previously set with respect to another apparatus; and
transmitting the instruction associated with the priority to an external device via a wireless communication channel, the external device being configured to capture the image.

(18)
A program for causing a computer to execute:
receiving an instruction to capture an image from at least one of a plurality of external devices via a wireless communication channel, each of the external devices having priority set previously; and
controlling an operation of an imaging unit based on the instruction depending on the priority of the external device serving as a source for transmission of the instruction, the imaging unit being configured to capture the image.

(19)
A program for causing a computer to execute:
associating an instruction to capture an image with priority previously set with respect to another apparatus; and
transmitting the instruction associated with the priority to an external device via a wireless communication channel, the external device being configured to capture the image.

(20)
An information processing system including:
a control apparatus configured to control an operation of an imaging unit configured to capture an image; and
a plurality of information processing terminals, each of the information processing terminals having priority set previously, wherein the information processing terminal includes
a transmitter configured to transmit an instruction to capture an image to the control apparatus via a wireless communication channel, and
the control apparatus includes
a receiver configured to receive the instruction from at least one of the plurality of information processing terminals via the communication channel, and
a controller configured to control an operation of the imaging unit based on the instruction depending on the priority set in the information processing terminal serving as a source for transmission of the instruction.

REFERENCE SIGNS LIST 10 image capturing apparatus
101 first communication unit
103 second communication unit
110 controller
111 identification unit
113 process execution unit
191 imaging unit
193 storage unit
30 information processing terminal
301 first communication unit
303 second communication unit
310 controller
390 UI
391 operation unit
393 display unit

The invention claimed is:
1. An information processing apparatus, comprising:
an image sensor configured to capture an image; and
circuitry configured to:
receive an instruction, via a first wireless communication channel, to capture the image from at least one external device of a plurality of external devices, wherein each of the plurality of external devices is associated with a priority;
control, based on the instruction and the priority associated with the at least one external device, an operation of the image sensor;
determine that the at least one external device is a master device based on the priority associated with the at least one external device is a highest priority among the plurality of external devices; and
output the captured image to each of the plurality of external devices via the first wireless communication channel based on the capture of the image by the instruction from the master device.
2. The information processing apparatus according to claim 1, wherein the plurality of external devices include the master device and at least one slave device having a lower priority than the master device, and
wherein the circuitry is further configured to control the operation of the image sensor based on reception of the instruction from one of the master device or the at least one slave device.
3. The information processing apparatus according to claim 2,
wherein the circuitry is further configured to control the operation of the image sensor to give preference to the instruction from the master device over the instruction from the at least one slave device.
4. The information processing apparatus according to claim 3,
wherein the circuitry is further configured to prevent, based on the operation of the image sensor by the instruction from the master device, the operation of the image sensor based on the instruction from the at least one slave device.
5. The information processing apparatus according to claim 2,
wherein the circuitry is further configured to control the operation of the image sensor based on the instruction from the master device.
6. The information processing apparatus according to claim 2,
wherein the circuitry is further configured to change a content of the image sensor based on the reception of the instruction from the master device or the at least one slave device.
7. The information processing apparatus according to claim 6,
wherein the circuitry is further configured to:
control the image sensor to sequentially capture moving images; and
extract frame images from the sequentially captured moving images as the image captured based the reception of the instruction from the at least one slave device.
8. The information processing apparatus according to claim 6,
wherein based on the reception of the instruction from the at least one slave device, the circuitry is further configured to:
control the image sensor to change a first capturing condition set previously based on the instruction from the master device to a second capturing condition based on the reception of the instruction from the at least one slave device to capture the image; and
cause the image sensor to change the second capturing condition to the first capturing condition after the capture of the image.
9. The information processing apparatus according to claim 6,
wherein, based on a magnification ratio instructed from the at least one slave device, the circuitry is further configured to acquire a digital zoom image corresponding to at least a portion of the image captured by the image sensor.
10. The information processing apparatus according to claim 2,
wherein the circuitry is further configured to identify the master device and the at least one slave device among the plurality of external devices.
11. The information processing apparatus according to claim 10,
wherein the circuitry is further configured to identify an external device, which executes a communication sequence, as the master device among the plurality of external devices.
12. The information processing apparatus according to claim 10,
wherein the circuitry is further configured to identify, as the master device, an external device located in a threshold distance to the image sensor among the plurality of external devices.
13. The information processing apparatus according to claim 10,
wherein the circuitry is further configured to identify an external device among the plurality of external devices as the master device, and wherein the external device is in contact with the information processing apparatus.

14. The information processing apparatus according to claim 10,
wherein the circuitry is further configured to identify an external device connected via a second wireless communication channel as the master device among the plurality of external devices, and wherein the second wireless communication channel is different from the first wireless communication channel.

15. A first information processing apparatus, comprising: circuitry configured to:
associate an instruction to capture an image with a priority, wherein the priority is associated with the first information processing apparatus with respect to a second information processing apparatus;
transmit the instruction to an external device via a wireless communication channel, wherein the external device controls an operation to capture the image based on the transmitted instruction; and
receive the captured image from the external device via the wireless communication channel based on the instruction received by the external device from a master device, wherein the master device has a highest priority among respective priorities associated with a plurality of devices connected to the external device.

16. An information processing method, comprising:
capturing, by an image sensor, an image;
receiving an instruction, via a wireless communication channel, to capture the image from at least one external device of a plurality of external devices, wherein each of the plurality of external devices is associated with a priority;
controlling, by a processor, an operation of the image sensor based on the instruction and the priority associated with the at least one external device;
determining that the at least one external device is a master device based on the priority associated with the at least one external device is a highest priority among the plurality of external devices; and
outputting the captured image to each of the plurality of external devices via the wireless communication channel based on the capture of the image by the instruction from the master device.

17. An information processing method, comprising:
in a first apparatus:
associating, by a processor, an instruction to capture an image with a priority, wherein the priority is associated with the first apparatus with respect to a second apparatus;
transmitting the instruction to an external device via a wireless communication channel, wherein the external device is configured to capture the image based on the transmitted instruction; and
receiving the captured image from the external device via the wireless communication channel based on the instruction received by the external device from a master device, wherein the master device has a highest priority among respective priorities associated with a plurality of devices connected to the external device.

18. A non-transitory computer-readable storage medium having stored thereon computer-executable instructions for causing a computer to execute operations, the operations comprising:

capturing an image;
receiving an instruction, via a wireless communication channel, to capture the image from at least one external device of a plurality of external devices, wherein each of the plurality of external devices is associated with a priority;
controlling an operation of an image sensor based on the instruction and the priority associated with the at least one external device;
determining that the at least one external device is a master device based on the priority associated with the at least one external device is a highest priority among the plurality of external devices; and
outputting the captured image to each of the plurality of external devices via the wireless communication channel based on the capture of the image by the instruction from the master device.

19. A non-transitory computer-readable storage medium having stored thereon computer-executable instructions for causing a computer to execute operations, the operations comprising:
in a first apparatus:
associating an instruction to capture an image with a priority, wherein the priority is associated with the first apparatus with respect to a second apparatus;
transmitting the instruction to an external device via a wireless communication channel, wherein the external device is configured to capture the image based on the transmitted instruction; and
receiving the captured image from the external device via the wireless communication channel based on the instruction received by the external device from a master device, wherein the master device has a highest priority among respective priorities associated with a plurality of devices connected to the external device.

20. An information processing system, comprising:
a control apparatus configured to control an operation of an image sensor configured to capture an image; and
a plurality of information processing terminals, wherein each of the information processing terminals is associated with a priority, wherein
each of the information processing terminals includes:
a transmitter configured to transmit an instruction to capture the image to the control apparatus via a wireless communication channel, and
the control apparatus includes circuitry configured to:
receive the instruction, via the wireless communication channel, to capture the image from at least one information processing terminal of the plurality of information processing terminals;
control the operation of the image sensor, based on the instruction and the priority associated with the at least one information processing terminal;
determine that the at least one information processing terminal is a master terminal based on the priority associated with the at least one information processing terminal is a highest priority among the plurality of information processing terminals; and
output the captured image to each of the plurality of information processing terminals via the wireless communication channel based on the capture of the image by the instruction from the master terminal.

* * * * *